(12) United States Patent
Tachibana et al.

(10) Patent No.: US 11,837,799 B2
(45) Date of Patent: Dec. 5, 2023

(54) ANTENNA APPARATUS

(71) Applicant: Murata Manufacturing Co., Ltd., Nagaokakyo (JP)

(72) Inventors: Shinya Tachibana, Nagaokakyo (JP); Takafumi Nasu, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 381 days.

(21) Appl. No.: 17/324,156

(22) Filed: May 19, 2021

(65) Prior Publication Data

US 2021/0273334 A1 Sep. 2, 2021

Related U.S. Application Data

(63) Continuation of application No. PCT/JP2019/047118, filed on Dec. 3, 2019.

(30) Foreign Application Priority Data

Dec. 28, 2018 (JP) .................................. 2018-248689
Apr. 9, 2019 (JP) .................................. 2019-074126

(51) Int. Cl.
*H01Q 1/04* (2006.01)
*H01Q 5/335* (2015.01)
*H01Q 9/04* (2006.01)
*H04B 1/04* (2006.01)

(52) U.S. Cl.
CPC ........... *H01Q 5/335* (2015.01); *H01Q 9/0414* (2013.01); *H04B 1/0483* (2013.01)

(58) Field of Classification Search
CPC .............................. H01Q 5/335; H01Q 9/0414
See application file for complete search history.

(56) References Cited

U.S. PATENT DOCUMENTS

| 2014/0049440 A1 | 2/2014 | Ueki et al. |
| 2014/0218246 A1 | 8/2014 | Ishizuka et al. |
| 2019/0214727 A1 | 7/2019 | Mikawa et al. |

FOREIGN PATENT DOCUMENTS

| JP | 5505561 B2 | 5/2014 |
| WO | 2012/153690 A1 | 11/2012 |
| WO | 2014/034587 A1 | 3/2014 |
| WO | 2018/101284 A1 | 6/2018 |

OTHER PUBLICATIONS

Official Communication issued in International Patent Application No. PCT/JP2019/047118, dated Feb. 18, 2020.

*Primary Examiner* — Graham P Smith
(74) *Attorney, Agent, or Firm* — Keating & Bennett, LLP

(57) ABSTRACT

An antenna apparatus includes first and second antennas. First and second radiating elements include parallel extending portions. A first coil is connected between the first radiating element and a first feed circuit connection portion. A second coil is connected between the second radiating element and a ground conductor. The first and second coils are coupled to each other in additive polarity. A phase adjustment circuit adjusts a phase difference between currents respectively flowing through the first and second radiating elements to greater than or equal to about 90 degrees and less than about 180 degrees in a communication frequency band of the second antenna. Where a frequency of a fundamental of the first radiating element is f1 and a frequency of a fundamental of the second radiating element is f2, f1>f2, and 3f2−f1>f1−f2 are satisfied.

20 Claims, 18 Drawing Sheets

ANTENNA APPARATUS

CROSS REFERENCE TO RELATED APPLICATIONS

This application claims the benefit of priority to Japanese Patent Application No. 2019-074126 filed on Apr. 9, 2019 and Japanese Patent Application No. 2018-248689 filed on Dec. 28, 2018, and is a Continuation Application of PCT Application No. PCT/JP2019/047118 filed on Dec. 3, 2019. The entire contents of each application are hereby incorporated herein by reference.

BACKGROUND OF THE INVENTION

1. Field of the Invention

The present invention relates to an antenna apparatus provided in an electronic device having a communication function.

2. Description of the Related Art

In recent years, with an increase in communication bandwidth used in various communications, there is a growing demand for a wide-band antenna apparatus for covering a communication band. There is also a growing demand for an antenna apparatus that covers a wide band for use in a plurality of communication systems.

As one technique of providing a wide-band antenna apparatus, Japanese Patent No. 5505561 describes a technique in which an antenna apparatus includes a feed radiating element connected to a feed circuit and a passive radiating element physically separated from the feed circuit and the characteristics of the passive radiating element are added to the characteristics of the feed radiating element by coupling the passive radiating element to the feed radiating element with a magnetic field.

When the technique described in Japanese Patent No. 5505561 is used, it is conceivable to, for example, dispose a first radiating element and a second radiating element, such that the maximum electric field points of the first radiating element and second radiating element are close to each other to reduce a radiating element forming region. FIG. 22A is a diagram showing the configuration of such an antenna apparatus. In this example, a first radiating element 11 and a second radiating element 12 are coupled to each other via a coupling element 13 at their proximal portions that are portions of the radiating elements close to the coupling element, and a feed circuit FC1 is connected to a first radiating element 11-side portion. However, with this structure, electric field coupling between portions around the open ends of the first radiating element 11 and second radiating element 12 is strong, with the result that the radiation efficiency of each of the first radiating element 11 and the second radiating element 12 is decreased.

In FIG. 22A, the plus and minus signs indicate the polarities of potentials when the first radiating element 11 and the second radiating element 12 respectively resonate at certain frequencies. Portions around the distal ends are the maximum electric field points in the radiating elements 11, 12 having the shape as shown in FIG. 22A, so FIG. 22A is shown focusing on the potentials. In this way, the open ends of the first radiating element 11 and the second radiating element 12 have opposite polarities, so the first radiating element 11 and the second radiating element 12 are strongly coupled to each other with an electric field. For this reason, to maintain the radiation efficiency of each of the first radiating element 11 and the second radiating element 12, the first radiating element 11 and the second radiating element 12 are disposed such that, as shown in FIG. 22B, the open ends of the first radiating element 11 and second radiating element 12 are located away from each other, with the result that the radiating element forming region inevitably increases.

On the other hand, a communication antenna of a cellular phone includes a first antenna for communication and conversation, which covers a wide band of 0.7 GHz to 2.7 GHz, and a second antenna for, for example, GPS, which uses 1.5 GHz. In this case, in order for a signal input to the first antenna and a signal input to the second antenna not to interfere with each other, isolation between the two antennas needs to be ensured.

As shown in FIGS. 22A and 22B, in the first antenna including the first radiating element 11 and the second radiating element 12 coupled to each other, 0.70 GHz to 0.96 GHz (low band) is covered by the resonance of the fundamental, and 1.71 GHz to 2.17 GHz (middle band) and 2.30 GHz to 2.70 GHz (high band) are covered by the resonance of higher harmonics, so such a configuration is preferable in terms of each of the bands being widened. However, if a gain in the middle band and the high band is widened up to the frequency of a reception signal of the second antenna (for example, the above-described GPS antenna), isolation between the first antenna and the second antenna degrades.

SUMMARY OF THE INVENTION

Preferred embodiments of the present invention provide antenna apparatuses that each include a plurality of antennas to be used in a plurality of communication systems and that each ensure isolation between the antennas for the different communication systems without expanding a radiating element region.

An antenna apparatus according to a preferred embodiment of the present invention includes a first antenna, and a second antenna used in a communication frequency band different from a communication frequency band of the first antenna. The first antenna including a first radiating element, a second radiating element, a phase adjustment circuit, a first coil, and a second coil. The first radiating element and the second radiating element include parallel extending portions. The first coil is connected between the first radiating element and a connection portion of a first feed circuit. The second coil is connected between the second radiating element and a ground conductor. The phase adjustment circuit is connected to the second coil. The first coil and the second coil are formed in a single coupling element. The phase adjustment circuit adjusts a phase difference between a current flowing through the first radiating element and a current flowing through the second radiating element to greater than or equal to about 90 degrees and less than about 180 degrees in a communication frequency band of the second antenna.

According to preferred embodiments of the present invention, in antenna apparatuses each including a plurality of antennas to be used in a plurality of communication systems, isolation between radiating elements for the different communication systems is ensured without expanding a radiating element region. In other words, a radiating element region is reduced without decreasing isolation between the antennas for the different communication systems.

The above and other elements, features, steps, characteristics and advantages of the present invention will become

DETAILED DESCRIPTION OF THE PREFERRED EMBODIMENTS

Figure 1:
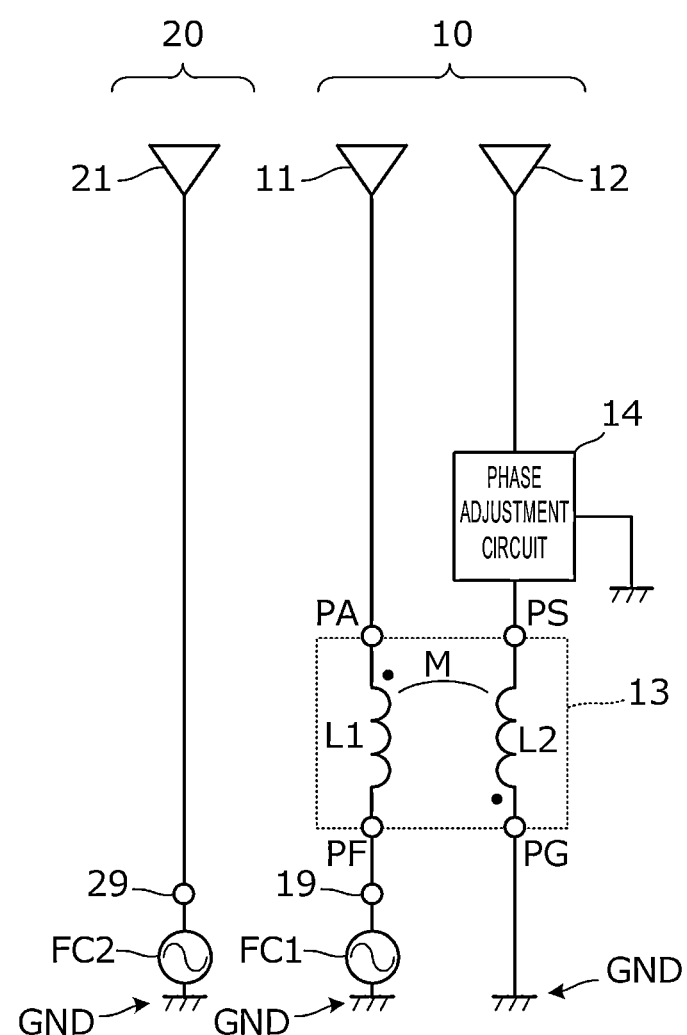
FIG. 1 is a circuit diagram of an antenna apparatus 101 according to a first preferred embodiment of the present invention.

Initially, some structures and features of the antenna apparatus according to preferred embodiments of the present invention are described below.

An antenna apparatus according to a preferred embodiment of the present invention includes a first antenna, and a second antenna used in a communication frequency band different from a communication frequency band of the first antenna. The first antenna includes a first radiating element, a second radiating element, a phase adjustment circuit, a first coil, and a second coil. The first radiating element and the second radiating element include parallel extending portions. The first coil is connected between the first radiating element and a connection portion of a first feed circuit. The second coil is connected between the second radiating element and a ground conductor. The phase adjustment circuit is connected to the second coil, the second radiating element, and a ground. The first coil and the second coil are coupled to each other in additive polarity. The phase adjustment circuit adjusts a phase difference between a current flowing through the first radiating element and a current flowing through the second radiating element to greater than or equal to about 90 degrees and less than about 180 degrees in the communication frequency band of the second antenna. Where a frequency of a fundamental of the first radiating element is f1 and a frequency of a fundamental of the second radiating element is f2, the first antenna satisfies f1>f2, and 3f2−f1>f1−f2.

With the above configuration, even when open ends of the first radiating element and second radiating element of which the fundamentals have frequencies close to each other are disposed close to each other, the potentials of the first radiating element and second radiating element can be changed to the same polarity by the phase inversion function of additive polarity coupling. Therefore, electric field coupling between the first radiating element and the second radiating element is reduced, isolation between the first radiating element and the second radiating element is ensured, and the first radiating element and the second radiating element can be disposed close to each other, such that a radiating element region is reduced. In addition, with the phase adjustment effect of the phase adjustment circuit, radiation of the first antenna can be reduced or prevented in the communication band of the second antenna, such that isolation between the first antenna and the second antenna is also ensured.

In an antenna apparatus according to a preferred embodiment of the present invention, the first radiating element and the second radiating element including a parallel extending portion where the first radiating element and the second radiating element run parallel or substantially parallel to each other. With this structure, a region required for the first radiating element and the second radiating element is reduced.

In an antenna apparatus according to a preferred embodiment of the present invention, the ground conductor is greater in size than any of the first radiating element and the second radiating element, the first radiating element and the second radiating element each include an open end, and a distance between the open end of the first radiating element and the ground conductor is greater than a distance between the open end of the first radiating element and the open end of the second radiating element. With this structure, the first radiating element and the second radiating element are located away from the maximum electric field point (maximum potential point) of the ground conductor, so the degradation of radiation characteristics due to the ground conductor is reduced or prevented. In other words, radiation using the first radiating element is performed by the operation of a dipole antenna having the maximum electric field point (maximum potential point) at the open end of the first radiating element and the maximum electric field point (maximum potential point) of the ground conductor having a polarity different from the polarity of the first radiating element, and radiation using the second radiating element is performed by the operation of a dipole antenna having the maximum electric field point (maximum potential point) at the open end of the second radiating element coupled in additive polarity to the first radiating element and the maximum electric field point (maximum potential point) of the ground conductor having a polarity different from the polarity of the second radiating element. With this configuration, the wide-band first antenna is effectively achieved by including the first radiating element and the second radiating element.

An antenna apparatus according to a preferred embodiment of the present invention further includes a first matching circuit connected between the phase adjustment circuit and the second radiating element. With this configuration, the second radiating element has an appropriate impedance or resonant frequency.

An antenna apparatus according to a preferred embodiment of the present invention further includes a second matching circuit connected between the second coil and the ground conductor. With this configuration, the resonant frequency of the second radiating element can be adjusted.

In an antenna apparatus according to a preferred embodiment of the present invention, the second matching circuit includes a plurality of matching circuits, and a switch that selects any one of the plurality of matching circuits. With this configuration, while the size of the second radiating element is reduced, the resonant frequency of the second radiating element can be appropriately set.

An antenna apparatus according to a preferred embodiment of the present invention further includes a third matching circuit connected between the first coil and the first radiating element. With this configuration, the resonant frequency of the first radiating element can be adjusted.

An antenna apparatus according to a preferred embodiment of the present invention further includes a fourth matching circuit connected between the first coil and a first feed circuit connection portion. With this configuration, even when, for example, the impedance of the first radiating element is lower than an appropriate value, it is possible to set the impedance to the appropriate value.

An antenna apparatus according to a preferred embodiment of the present invention further includes a fifth matching circuit connected between a third radiating element and a second feed circuit connection portion. With this configuration, the third radiating element has an appropriate impedance, phase (for feeding), or resonant frequency.

An antenna apparatus according to a preferred embodiment of the present invention further includes a sixth matching circuit connected between the first radiating element and the ground conductor. With this configuration, the first radiating element has an appropriate resonant frequency.

In an antenna apparatus according to a preferred embodiment of the present invention, the sixth matching circuit includes a plurality of matching circuits, and a switch that selects any one of the plurality of matching circuits. With this configuration, while the size of the first radiating element is reduced, the resonant frequency of the first radiating element can be appropriately set.

In an antenna apparatus according to a preferred embodiment of the present invention, the phase adjustment circuit includes a capacitor including one end connected to the ground conductor or an inductor including one end connected to the ground conductor. With this configuration, an appropriate phase for feeding the second radiating element is provided.

In an antenna apparatus according to a preferred embodiment of the present invention, each of the first radiating element and the second radiating element is a monopole radiating element. With this configuration, the flexibility of layout of conductor pattern for the first radiating element and the second radiating element is increased, and the conductor patterns can be disposed in a limited space.

In an antenna apparatus according to a preferred embodiment of the present invention, the first radiating element is an inverted-F antenna radiating element, and the first coil is connected to a feed portion of the inverted-F antenna radiating element. With this configuration, while the first radiating element is small, the first radiating element is capable of supporting a predetermined frequency band.

In an antenna apparatus according to a preferred embodiment of the present invention, the first radiating element is an inverted-F antenna radiating element, and the first coil is connected to a short-circuit portion of the inverted-F antenna radiating element. With this configuration, while the first radiating element is small, the first radiating element is capable of supporting a predetermined frequency band.

In an antenna apparatus according to a preferred embodiment of the present invention, an open end of the first radiating element and an open end of the second radiating element are respectively located in a direction away from each other from a proximal portion of the first radiating element and a proximal portion of the second radiating element. With this configuration, unnecessary electric field coupling between the open ends of the first radiating element and second radiating element is reduced.

In an antenna apparatus according to a preferred embodiment of the present invention, the first radiating element is a loop radiating element that terminates at a terminal portion via a reactance. With this configuration, the antenna can be disposed in a limited space. In addition, interference of an electromagnetic wave from an outside with the second radiating element is prevented.

An antenna apparatus according to a preferred embodiment of the present invention further includes a fourth radiating element coupled to the first radiating element or the second radiating element with an electromagnetic field. With this configuration, with the addition of the radiation characteristics of the fourth radiating element, a further wide-band antenna apparatus is obtained.

Hereinafter, a plurality of preferred embodiments of the present invention will be described by using some specific examples with reference to the accompanying drawings. The same reference signs are assigned to the same or corresponding portions in the drawings. In consideration of easiness of description or understanding of main points, preferred embodiments are described separately for the sake of convenience of description. However, partial replacements or combinations of components described in different preferred embodiments are possible. From second and subsequent preferred embodiments, the description of the same or similar matters to those of a first preferred embodiment is omitted, and only the differences will be described. Particularly, similar operation and advantageous effects with similar components will not be repeated one by one for each preferred embodiment.

First Preferred Embodiment

FIG. 1 is a circuit diagram of an antenna apparatus 101 according to a first preferred embodiment of the present invention. The antenna apparatus 101 includes a first antenna 10 and a second antenna 20. The first antenna 10 includes a first radiating element 11, a second radiating element 12, a phase adjustment circuit 14, and a coupling element 13.

The coupling element 13 includes a first coil L1 and a second coil L2. The first coil L1 is connected between the first radiating element 11 and a first feed circuit connection portion 19. The second coil L2 is connected between the second radiating element 12 and a ground conductor GND. The phase adjustment circuit 14 is connected between the second coil L2 and the second radiating element 12. The first coil L1 and the second coil L2 are coupled in additive polarity to each other. In FIG. 1, "M" represents that the first coil L1 and the second coil L2 are coupled and a mutual inductance is generated as a result of the coupling.

Each of the first radiating element 11 and the second radiating element 12 covers, for example, about 0.7 GHz to about 0.96 GHz (low band) of a cellular phone with the frequency of the fundamental and covers, for example, about 1.71 GHz to about 2.17 GHz (middle band) and about 2.30 GHz to about 2.70 GHz (high band) with a third harmonic (third-order harmonic).

The second antenna 20 includes a third radiating element 21. The third radiating element 21 is connected to a second feed circuit connection portion 29. The third radiating element 21 covers, for example, the 1.580 GHz band of GPS.

Where the frequency of the fundamental of the first radiating element 11 is f1, and the frequency of the fundamental of the second radiating element 12 is f2, f1>f2, and 3f2−f1>f1−f2 are preferably satisfied.

Where the inductance of the first coil L1 of the coupling element 13 is represented by L1, the inductance of the second coil L2 is represented by L2, a current flowing through the first radiating element 11 is represented by i1, a current flowing through (supplied to) the second radiating element 12 is represented by i2, and the impedance of the second radiating element is represented by Z2, the relationship is expressed by i1=(Z2/jωM)i2.

In the present preferred embodiment, f1>f2, so Z2 is constantly inductive in the communication band of the first antenna 10, and the impedance is expressed by jωL, so a current flowing through the first radiating element 11 and a current flowing through the second radiating element 12 are in phase (a phase difference in current is greater than or equal to about 0 degrees and less than about 90 degrees). In other words, the potentials are also in phase. Thus, even when the first radiating element 11 and the second radiating element 12 include parallel extending portions, electric field coupling between both radiating elements is reduced or prevented. If f1<f2, a frequency range arises in which Z2 is capacitive in the communication band of the first antenna 10 (the impedance is expressed by −j/ωC). In this frequency range, a current flowing through the first radiating element 11 and a current flowing through the second radiating element 12 are in opposite phase (a phase difference in current is greater than or equal to about 90 degrees and less than about 180 degrees).

Therefore, to enable additive polarity coupling by the coupling element 13 as described above, the relationship f1>f2 is preferable.

Furthermore, a difference between the frequency of the fundamental of the first radiating element 11 and the frequency of the fundamental of the second radiating element 12 is less than a difference between the frequency of the fundamental of the first radiating element 11 and a third harmonic frequency of the second radiating element. In other words, the resonant frequency of the fundamental of the second radiating element 12 is closer to the resonant frequency of the fundamental of the first radiating element 11 than to the resonant frequency of the third harmonic. Thus, the communication band of the first antenna 10, covered by the resonant frequency of the fundamental of the first radiating element 11, is widened by the resonant frequency of the fundamental of the second radiating element 12. In addition, the first radiating element 11 and the second radiating element 12 respectively resonate with the fundamentals at the resonant frequencies close to each other in this way, and, when the first radiating element 11 and the second radiating element extend parallel or substantially parallel to each other, the maximum electric field points in the respective radiating elements 11, 12 are close to each other, and the radiating elements 11, 12 are coupled to each other with an electric field. However, electric field coupling between the radiating elements 11, 12 is reduced or prevented by inverting the phase in additive polarity coupling using the coupling element 13. When a distance between the maximum electric field point of the first radiating element 11 at the resonant frequency of the fundamental of the first radiating element 11 and the maximum electric field point of the second radiating element 12 at the resonant frequency of the fundamental of the second radiating element 12 is less than a distance between the maximum electric field point of the first radiating element 11 at the resonant frequency of the fundamental of the first radiating element 11 and the maximum electric field point of the ground conductor as well, the radiating elements 11, 12 are similarly coupled to each other with an electric field when the first radiating element 11 and the second radiating element 12 extend parallel or substantially parallel to each other. However, electric field coupling between the radiating elements 11, 12 is reduced or prevented by inverting the phase in additive polarity coupling using the coupling element 13.

With this configuration, the characteristics resulting from the resonance of the fundamental of the second radiating element 12 are added to the characteristics resulting from the resonance of the fundamental of the first radiating element 11, and a wide-band gain is achieved in about 0.70 GHz to about 0.96 GHz (low band), for example. In addition, the characteristics resulting from the third harmonic resonance of the second radiating element 12 are added to the characteristics resulting from the third harmonic resonance of the first radiating element 11, and a wide-band gain is achieved in about 1.71 GHz to about 2.70 GHz (middle band and high band), for example.

Since the first coil L1 and second coil L2 of the coupling element 13 are coupled in additive polarity to each other, when wide-band radiation characteristics are provided by adding the second radiating element 12 and the coupling element 13, unnecessary electric field coupling between the first radiating element 11 and the second radiating element 12 is reduced even when the open ends of the first radiating element 11 and second radiating element 12 are close to each other. Therefore, the first radiating element 11 and the second radiating element 12 can be disposed close to each other, such that a radiating element region is reduced.

Figure 2A:
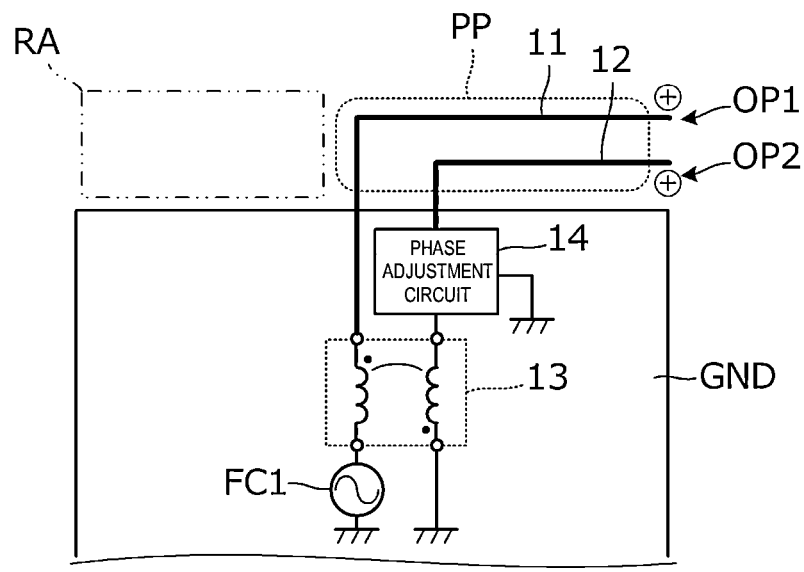
FIG. 2A is a diagram showing the shape of each of a first radiating element 11 and a second radiating element 12.
Figure 2B:
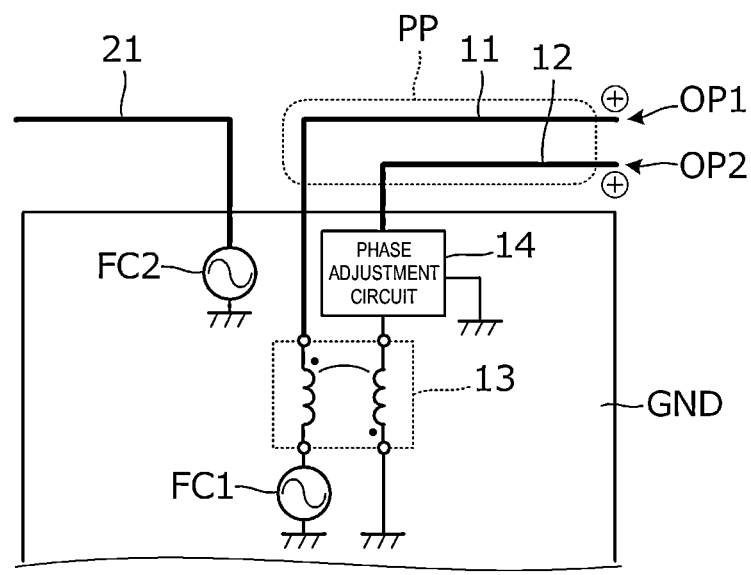
FIG. 2B is a diagram showing the shape of each of the first radiating element 11, the second radiating element 12, and a third radiating element.

FIG. 2A is a diagram showing the shape of each of the first radiating element 11 and the second radiating element 12. FIG. 2B is a diagram showing the shape of each of the first radiating element 11, the second radiating element 12, and the third radiating element 21.

In FIGS. 2A and 2B, each of the first radiating element 11, the second radiating element 12, and the third radiating element 21 is, for example, a monopole radiating element. More specifically, each radiating element is configured such that the middle of a grounded ¼-wave length monopole radiating element is bent at an angle of about 90°, for example.

As described above, since the first coil L1 and second coil L2 of the coupling element 13 are coupled in additive polarity to each other, even when the open end OP1 of the first radiating element 11 and the open end OP2 of the second radiating element 12 are close to each other, electric field coupling between the first radiating element 11 and the second radiating element 12 is reduced.

In FIGS. 2A and 2B, the plus and minus signs indicate the polarities of potentials when the first radiating element 11 and the second radiating element 12 respectively resonate at certain frequencies. In this way, the open ends of the first radiating element 11 and second radiating element 12 have the same polarities, so electric field coupling between the first radiating element 11 and the second radiating element 12 is reduced. Therefore, the first radiating element 11 and the second radiating element 12 can be disposed close to each other, such that a radiating element region reduction portion RA shown in FIG. 2A is provided.

FIG. 2B is an example in which the third radiating element 21 is provided in the radiating element region reduction portion RA shown in FIG. 2A.

As shown in FIGS. 2A and 2B, the first radiating element 11 and the second radiating element 12 include a parallel extending portion PP in which the first radiating element 11 and the second radiating element 12 extend parallel or substantially parallel to each other. With this configuration, since the first radiating element 11 and the second radiating element 12 are close to each other over a long dimension, a region in which the first radiating element 11 and the second radiating element 12 are disposed is reduced.

Figure 3:
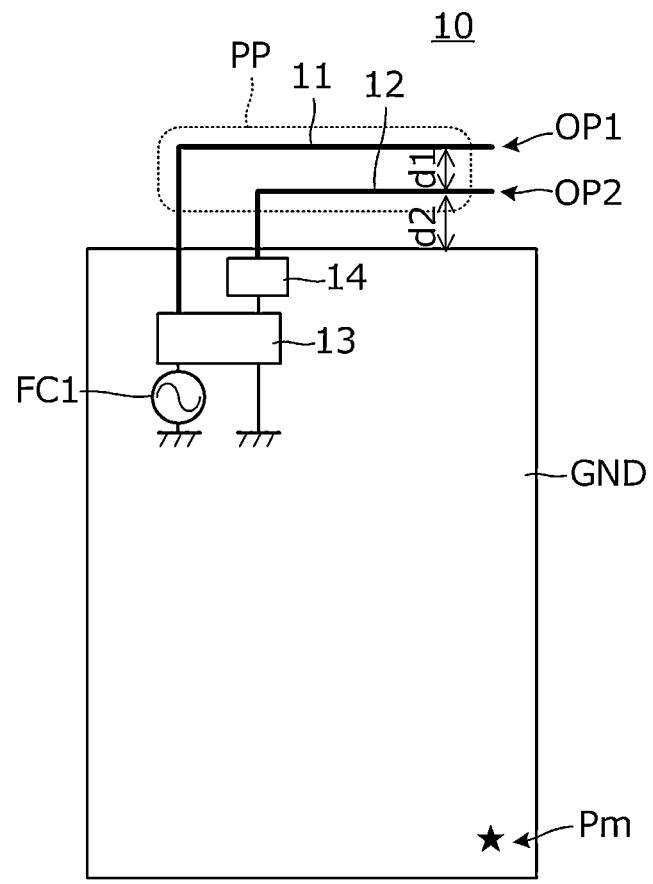
FIG. 3 is a diagram showing the relationship between a ground conductor and each of the first radiating element 11 and the second radiating element 12 in a first antenna 10.

FIG. 3 is a diagram showing the relationship between the ground conductor and each of the first radiating element 11 and the second radiating element 12 in the first antenna 10. Each of the first radiating element 11 and the second radiating element 12 may be defined by, for example, a planar conductor as shown in FIG. 3, a linear conductor, or the like. The ground conductor is defined by, for example, a planar conductor as shown in FIG. 3. In this example, the size of the ground conductor GND is greater than any of the first radiating element 11 and the second radiating element 12. In other words, when each of the first radiating element 11 and the second radiating element 12 is compared with the ground conductor in area, the size of the ground conductor is greater. The first radiating element 11 includes the open end OP1. The second radiating element 12 includes the open end OP2. A distance d2 between the open end OP2 of the second radiating element 12 and the ground conductor GND is greater than a distance d1 between the open end OP1 of the first radiating element 11 and the open end OP2 of the second radiating element 12 (d2>d1).

The position indicated by the star sign in FIG. 3 is a maximum electric field point (maximum potential point) Pm in the ground conductor GND. Since the ground conductor GND is a conductor having a planar shape, a position farthest from the first feed circuit FC1 is normally a maximum electric field point (maximum potential point).

With this structure, the first radiating element 11 and the second radiating element 12 are located away from the maximum electric field point (maximum potential point) of the ground conductor GND, so the degradation of radiation characteristics due to the ground conductor GND is reduced or prevented. In other words, since the maximum electric field point (maximum potential point) at the open end of the first radiating element 11 and the maximum electric field point (maximum potential point) of the ground conductor GND having a polarity different from the polarity of the first radiating element 11 are located away from each other, radiation using the first radiating element 11 is performed in accordance with the operation of a dipole antenna. Similarly, since the maximum electric field point (maximum potential point) at the open end of the second radiating element 12 coupled in additive polarity to the first radiating element 11 and the maximum electric field point (maximum potential point) of the ground conductor having a polarity different from the polarity of the second radiating element 12 are located away from each other, radiation using the second radiating element 12 is performed in accordance with the operation of a dipole antenna. In this way, since the maximum electric field points (maximum potential points) at the open ends of the first radiating element 11 and second radiating element 12 coupled in additive polarity to the first radiating element 11 are in phase in the first antenna 10, the two dipole antennas are concurrently provided.

With this configuration, the wide-band first antenna 10 is effectively obtained by including the first radiating element 11 and the second radiating element 12.

When spacing between the second radiating element 12 and the ground conductor GND is greater than spacing between the first radiating element 11 and the ground conductor GND, the relationship is similarly expressed by d2>d1, where a distance between the open end OP1 of the first radiating element 11 and the ground conductor GND is represented by d2.

Figure 4:
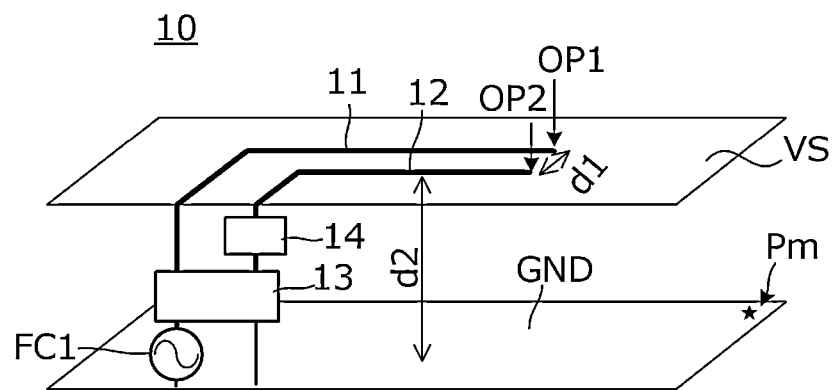
FIG. 4 is a diagram showing the relationship between the ground conductor and each of the first radiating element 11 and the second radiating element 12 in the first antenna 10.

FIG. 4 is a diagram showing the relationship between the ground conductor GND and each of the first radiating element 11 and the second radiating element 12 in the first antenna 10. Different from the example shown in FIG. 3, in this example, the first radiating element 11 and the second radiating element 12 are provided on the radiating element surface VS, and the radiating element surface VS faces parallel or substantially parallel to the ground conductor GND.

In FIG. 4, the size of the ground conductor GND is greater than the first radiating element 11 and the second radiating element 12. The first radiating element 11 includes the open end OP1. The second radiating element 12 includes the open end OP2. Where each of a distance between the open end OP1 of the first radiating element 11 and the ground conductor GND and a distance between the open end OP2 of the second radiating element 12 and the ground conductor GND is represented by d2 and a distance between the open end OP1 of the first radiating element 11 and the open end OP2 of the second radiating element 12 is represented by d1, the relationship d2>d1 is satisfied.

As in the case of the example shown in FIG. 3, the position indicated by the star sign in FIG. 4 is a maximum electric field point (maximum potential point) Pm in the ground conductor.

With the structure shown in FIG. 4, the first radiating element 11 and the second radiating element 12 are located away from the maximum electric field point (maximum potential point) of the ground conductor GND, so the degradation of radiation characteristics due to the ground conductor GND is reduced or prevented. In other words, the maximum electric field points (maximum potential points) at the open ends of the first radiating element 11 and second radiating element 12 coupled in additive polarity to the first radiating element 11 are in phase, whereas the maximum electric field point (maximum potential point) of the ground conductor having a different polarity is located away, so the first antenna 10 radiates in accordance with the operation of a dipole antenna. With this configuration, the wide-band first antenna 10 is effectively obtained by including the first radiating element 11 and the second radiating element 12.

Figure 5:
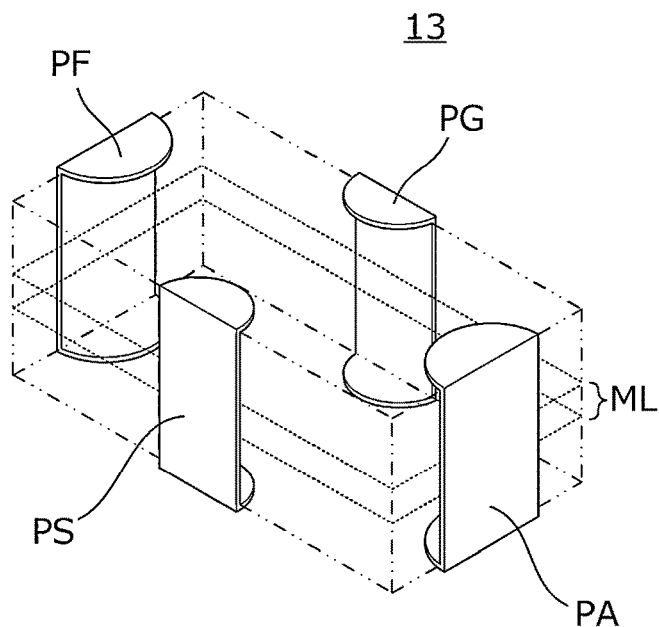
FIG. 5 is an external perspective view of a coupling element 13.

FIG. 5 is an external perspective view of the coupling element 13. The coupling element 13 is a laminated body including a plurality of electrically insulating base materials, and conductor patterns are respectively provided on the plurality of electrically insulating base materials of an intermediate layer ML. A first radiating element connection terminal PA, a second radiating element connection terminal PS, a feed circuit connection terminal PF, and a ground connection terminal PG are provided on the outer surface of the coupling element 13.

Figure 6:
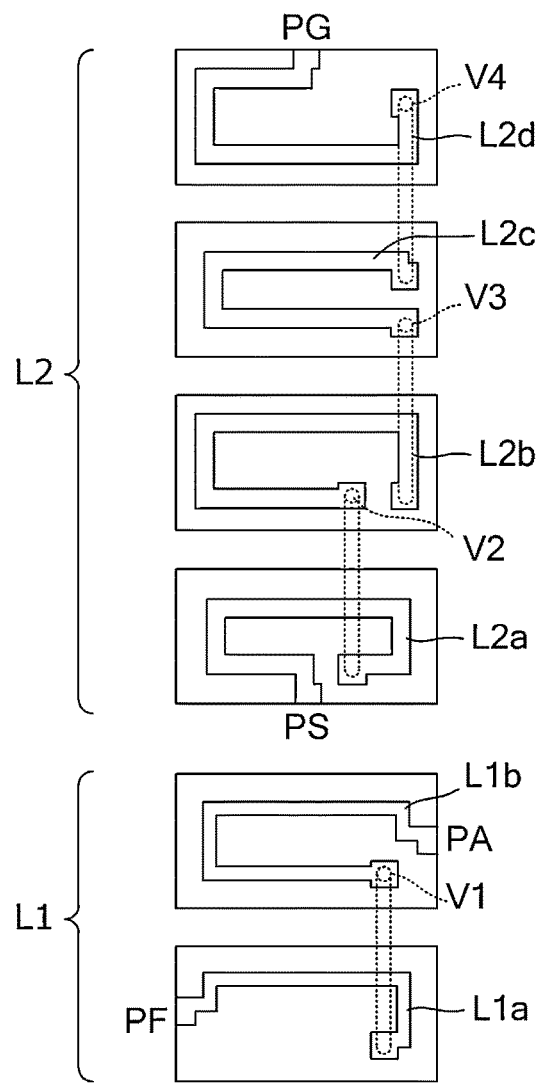
FIG. 6 is a plan view showing conductor patterns respectively provided on a plurality of electrically insulating base materials of the coupling element 13.
Figure 7:
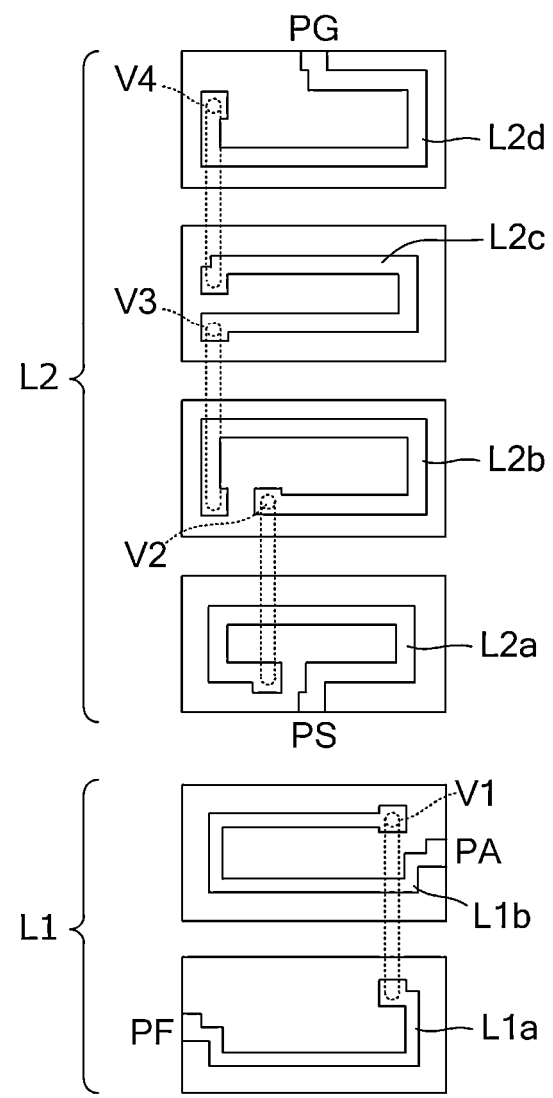
FIG. 7 is a plan view showing conductor patterns respectively provided on a plurality of electrically insulating base materials of the coupling element 13 and is an example different from the example shown in FIG. 6.

FIG. 6 and FIG. 7 are plan views showing conductor patterns respectively provided on the plurality of electrically insulating base materials of the intermediate layer ML of the coupling element 13. FIG. 6 and FIG. 7 show different examples of the conductor patterns.

A conductor pattern L1a and a conductor pattern L1b are connected via an interlayer connection conductor V1. A conductor pattern L2a and a conductor pattern L2b are connected via an interlayer connection conductor V2. The conductor pattern L2b and a conductor pattern L2c are connected via an interlayer connection conductor V3. The conductor pattern L2c and a conductor pattern L2d are connected via an interlayer connection conductor V4. The first coil L1 includes the conductor patterns Lia, Lib and the interlayer connection conductor V1. The second coil L2 includes the conductor patterns L2a to L2d and the interlayer connection conductors V2, V3, V4. One end of the conductor pattern Lia is connected to the feed circuit connection terminal PF. One end of the conductor pattern Lib is connected to the first radiating element connection terminal PA. One end of the conductor pattern L2a is connected to the second radiating element connection terminal PS. One end of the conductor pattern L2d is connected to the ground connection terminal PG.

In each of the example shown in FIG. 6 and the example shown in FIG. 7, the first coil L1 and the second coil L2 are wound such that the orientation of a magnetic field generated in the first coil L1 when a current flows in a direction from the feed circuit connection terminal PF to the first radiating element connection terminal PA and the orientation of a magnetic field generated in the second coil L2 when a current flows in a direction from the ground connection terminal PG to the second radiating element connection terminal PS are opposite from each other. In other words, the first coil L1 and the second coil L2 are coupled in additive polarity to each other. With this structure, even when, for example, the first radiating element 11 and the second radiating element 12 include portions extending in the same or substantially in the same direction, the first coil L1 and the second coil L2 are wound in directions such that magnetic fluxes generated from the two elements reinforce each other, so a decrease in radiation efficiency is reduced. When the numbers of turns of the first coil L1 and second coil L2 are equal but when the first coil L1 and the second coil L2 are coupled in additive polarity to each other, a decrease in radiation efficiency is similarly reduced. When the number of turns of the second coil L2 is greater than the number of turns of the first coil L1 as in the case of the example shown in FIG. 6 and in the same of the example shown in FIG. 7, the second radiating element 12 connected to the second coil L2 is relatively long. Therefore, an advantageous effect is obtained in, for example, an antenna apparatus for a low band.

Of course, each base material layer has a thickness. To reduce influences on peripheral components and the like and influences from peripheral components, a free layer on which no conductor pattern is provided may be laminated between the base material layers. The free layer is preferably inserted in layers below L11 that is the lowermost-layer conductor pattern of the first coil L1 or inserted in layers above L24 that is the uppermost-layer conductor pattern of the second coil L2. With such a configuration, a predetermined coupling coefficient between the first coil L1 and the second coil L2 is maintained.

The structure of the coupling element 13 is not limited to those shown in FIG. 6 and FIG. 7. For example, the first coil L1 and the second coil L2 may include conductor patterns that provide capacitive coupling.

Figure 8:
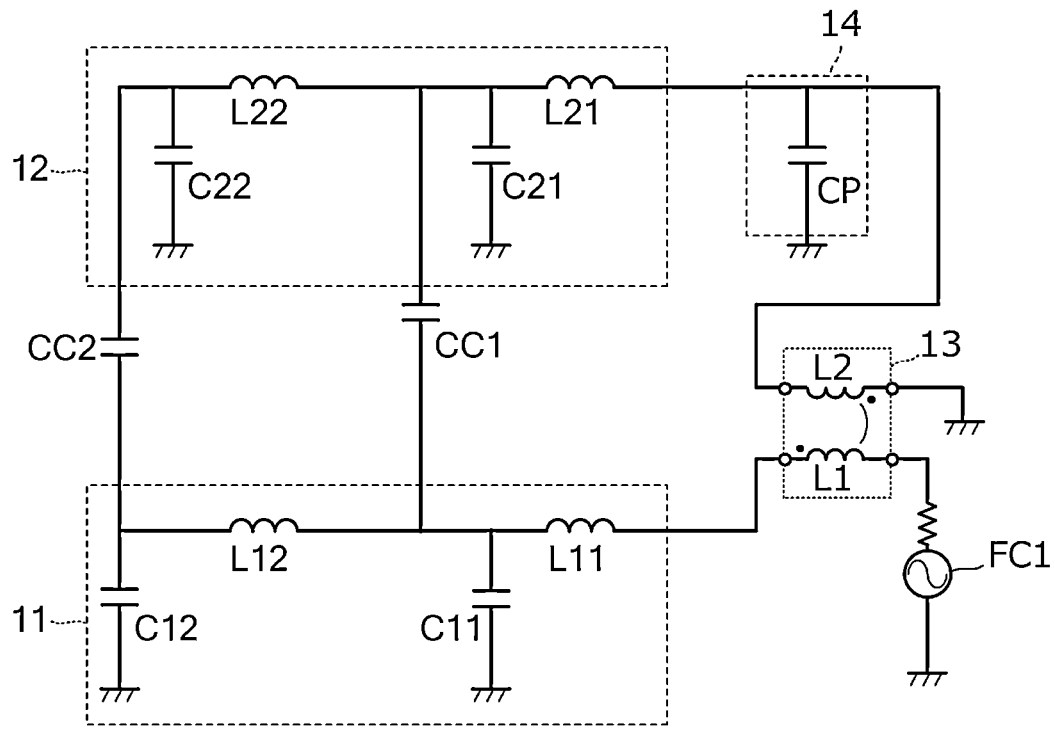
FIG. 8 is an equivalent circuit diagram of the antenna apparatus 101 to obtain phase-frequency characteristics.

FIG. 8 is an equivalent circuit diagram of the antenna apparatus 101 to obtain the phase-frequency characteristics, which will be described later. As shown in FIG. 8, the first radiating element 11 is represented by inductors L11, L12 and capacitors C11, C12. Similarly, the second radiating element 12 is represented by inductors L21, L22 and capacitors C21, C22. These inductors correspond to the inductance components of the radiating elements 11, 12. The capacitors correspond to capacitive components between the ground conductor and both of the radiating elements 11, 12. The phase characteristics are calculated by representing an actual antenna apparatus with a circuit such as, for example, the equivalent circuit diagram shown in FIG. 8.

Particularly, the inductor L11 and the capacitor C11 are the reactance that acts at the frequency of the third harmonic (third-order harmonic resonance) of the first radiating element 11. Similarly, the inductor L21 and the capacitor C21 are the reactance that acts at the frequency of the third harmonic (third-order harmonic resonance) of the second radiating element 12.

A capacitor CC1 is a capacitance between the first radiating element 11 and the second radiating element 12 at the maximum electric field points at the frequencies of the third harmonics of the first radiating element 11 and second radiating element 12. A capacitor CC2 is a capacitance between the first radiating element 11 and the second radiating element 12 at the maximum electric field points at the frequencies of the fundamentals of the first radiating element 11 and second radiating element 12.

In FIG. 8, a capacitor CP is a capacitor provided in the phase adjustment circuit 14.

Figure 9:
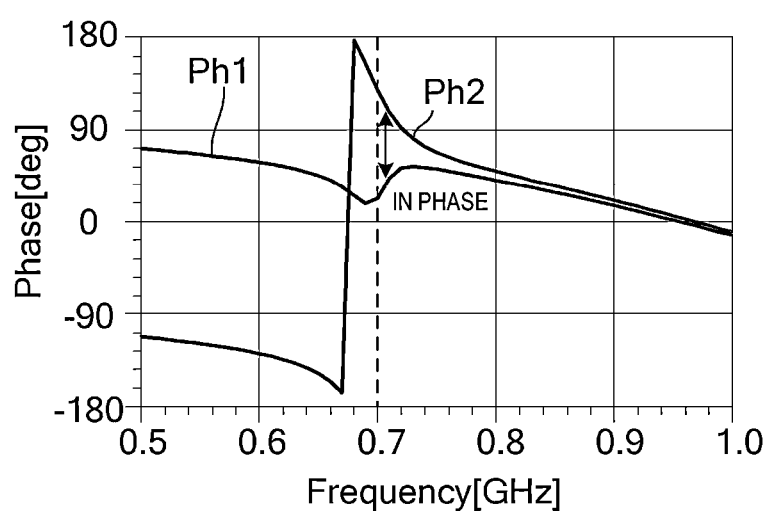
FIG. 9 is a graph showing the frequency characteristics of phases for feeding the first radiating element 11 and the second radiating element 12, of the antenna apparatus 101 shown in FIG. 8.

In FIG. 8, the values of the elements are as follows.
L11: about 8 nH, about 1 ohm
L12: about 15 nH, about 10 ohm
C11: about 0.4 pF
C12: about 0.8 pF
L21: about 12 nH, about 2 ohm
L22: about 26 nH, about 4 ohm
C21: about 0.6 pF
C22: about 0.8 pF
CC1: about 0.1 pF
CC2: about 0.2 pF
CP: about 0.6 pF FIG. 9 is a graph showing the frequency characteristics of phases for feeding the first radiating element 11 and the second radiating element 12, of the antenna apparatus 101 shown in FIG. 8. In FIG. 9, Ph1 is a phase for feeding the first radiating element 11, and Ph2 is a phase for feeding the second radiating element 12.

With the additive polarity magnetic field coupling of the coupling element 13, a difference between the phase for feeding the first radiating element 11 and the phase for feeding the second radiating element 12 is less than about 90 degrees at or higher than about 0.7 GHz that is a lower limit frequency in the communication band of the antenna apparatus of the present preferred embodiment. In other words, the phases are in phase or substantially in phase at or higher than about 0.7 GHz. In this way, when the close maximum electric field points of the first radiating element 11 and second radiating element 12 are set in phase using the phase inversion function of the coupling element 13, electric field coupling between the first radiating element 11 and the second radiating element 12 is reduced, and a decrease in radiation efficiency is reduced.

Figure 10:
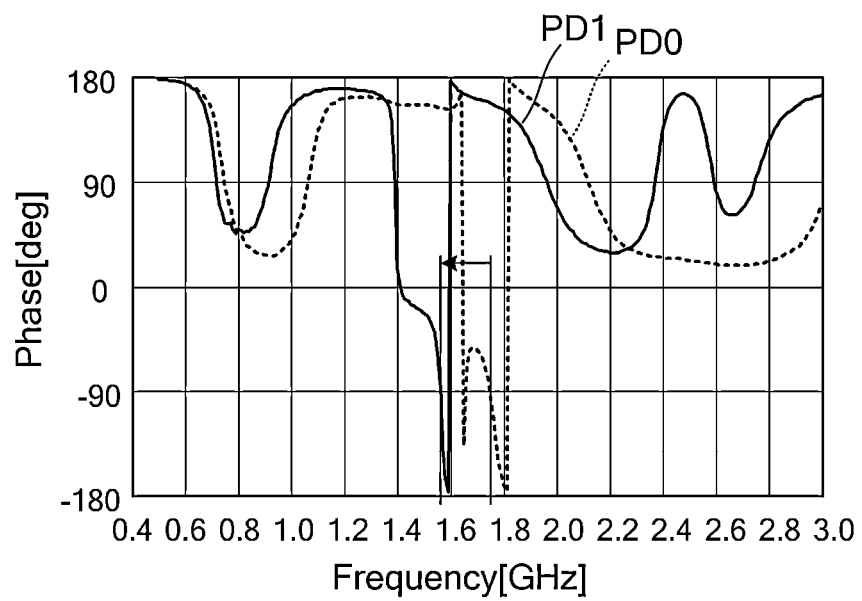
FIG. 10 is a graph showing an improvement in isolation between antennas for two communication systems by a phase adjustment circuit 14.

FIG. 10 is a graph showing an improvement in isolation between the antennas for two communication systems by the phase adjustment circuit 14. In FIG. 10, the abscissa axis represents frequency, and the ordinate axis represents a difference between a phase for feeding the first radiating element 11 and a phase for feeding the second radiating element 12. In FIG. 10, PD0 represents the characteristics in the case where the phase adjustment circuit 14 is not provided (comparative example), and PD1 represents the characteristics of the antenna apparatus 101 of the present preferred embodiment. Here, when a frequency at which the phase difference is about 90 degrees, that is, a frequency (frequency band) at which isolation between the antennas for two communication systems is poor, is compared, the frequency is about 1.8 GHz in the comparative example, whereas the frequency shifts to about 1.6 GHz in the present preferred embodiment. In other words, between the low band and the middle band, not in the communication band of the first antenna 10, a phase difference between the first radiating element 11 and the second radiating element 12 indicates an opposite phase (e.g., greater than or equal to about 0 degrees and less than about 180 degrees). In other words, the first antenna 10 does not function as an antenna in this frequency band, and isolation between the first antenna 10 and the second antenna 20 is ensured.

When, for example, the second antenna 20 is an antenna for GPS, the frequency band is preferably set so as to be higher than or equal to the resonant frequency of the third harmonic of the first antenna 10 and not to overlap the 1.6 GHz band of GPS. More specifically, in the first antenna 10 of the present preferred embodiment, the frequency of the fundamental of the second radiating element 12 is lower than the frequency of the fundamental of the first radiating element 11, such that the third harmonic of the second radiating element 12 is preferably set so as not to overlap the GPS frequency band covered by the second antenna 20. For example, the resonant frequency of the third harmonic of the second radiating element 12 is preferably set to higher than or equal to about 1.7 GHz.

The phase adjustment circuit 14 sets a phase difference between a current flowing through the first radiating element 11 and a current flowing through the second radiating element 12 in opposite phase (e.g., greater than or equal to about 90 degrees and less than about 180 degrees) in the communication frequency band of the second antenna 20.

Figure 11:
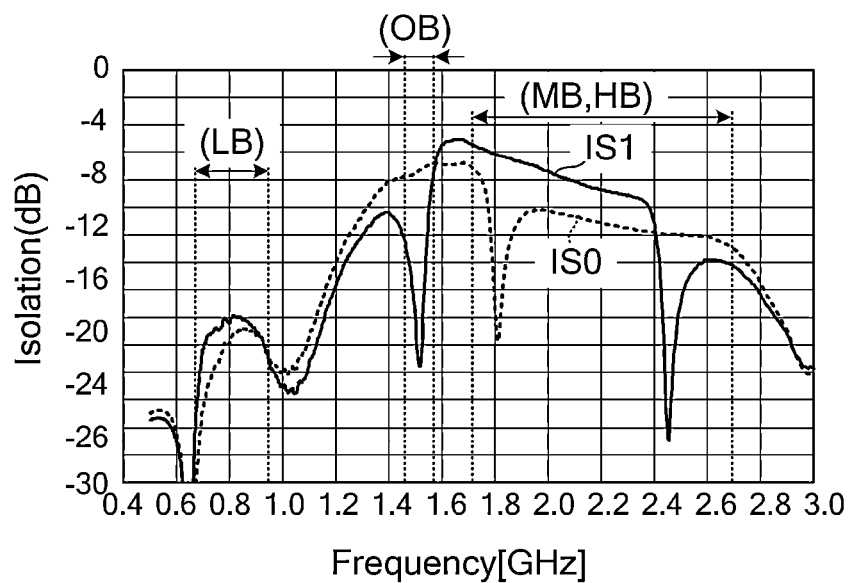
FIG. 11 is a graph showing the frequency characteristics of isolation between the radiating elements for the different communication systems.

FIG. 11 is a graph showing the frequency characteristics of isolation between the radiating elements for different communication systems. In FIG. 11, the abscissa axis represents frequency, and the ordinate axis represents the amount of isolation between the first antenna 10 and the second antenna 20 (see FIG. 1). In FIG. 11, IS0 represents the characteristics in the case where the phase adjustment circuit 14 is not provided (comparative example), and IS1 represents the characteristics of the antenna apparatus 101 of the present preferred embodiment. In FIG. 11, (LB) about 0.7 GHz to about 0.96 GHz represents a low band, and (MB, HB) about 1.71 GHz to about 2.7 GHz represents a middle band and a high band. (0B) represents a GPS frequency band as an example of a second communication system.

As shown in FIG. 11, according to the present preferred embodiment, isolation is improved in the band of the second communication system (0B). Therefore, as shown in FIG. 2B, even when the first radiating element 11 and second radiating element 12 of the first antenna 10 and the third radiating element 21 of the second antenna 20 are close to each other, degradation of the characteristics of the first antenna 10 and second antenna 20 (see FIG. 1) is reduced.

Not limited to the above-described preferred embodiment, the coupling element 13 and the phase adjustment circuit 14 may be configured as a single element to enable a further reduction in size.

Second Preferred Embodiment

A second preferred embodiment of the present invention describes a modification of the antenna apparatus 101 described in the first preferred embodiment.

Figure 12:
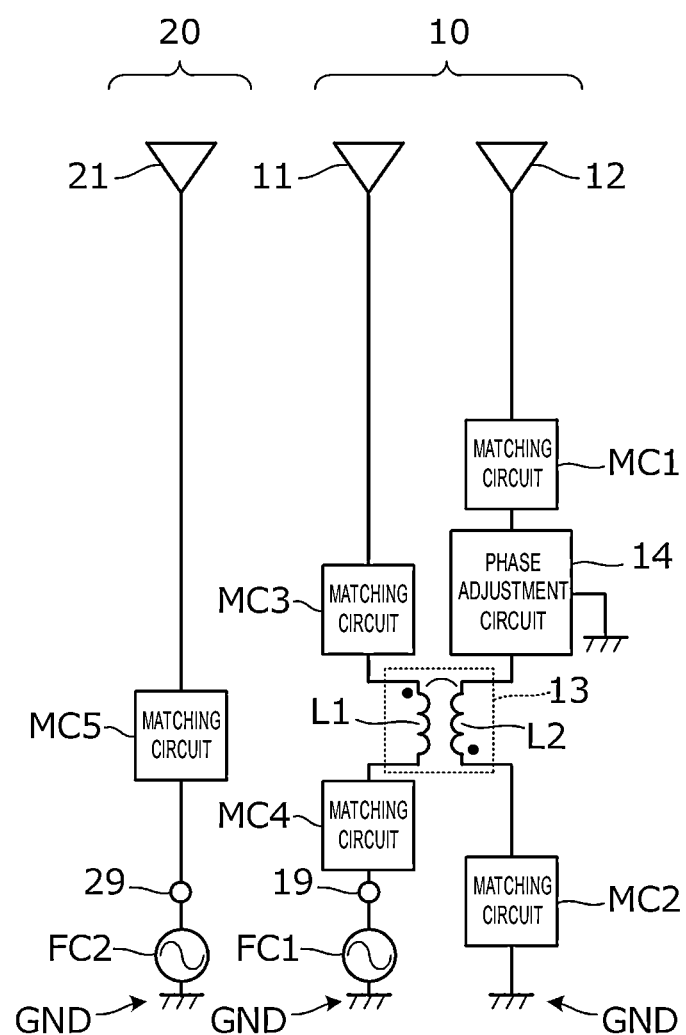
FIG. 12 is a circuit diagram of an antenna apparatus 102 according to a second preferred embodiment of the present invention.

FIG. 12 is a circuit diagram of an antenna apparatus 102 according to the second preferred embodiment. In the antenna apparatus 102, a first matching circuit MC1 is provided between the phase adjustment circuit 14 and the second radiating element 12. A second matching circuit MC2 is provided between the ground conductor GND and the second coil L2 of the coupling element 13. A third matching circuit MC3 is provided between the first coil L1 and the first radiating element 11. A fourth matching circuit MC4 is provided between the first coil L1 and the first feed circuit connection portion 19. A fifth matching circuit MC5 is provided between the third radiating element 21 and a second feed circuit FC2.

The first matching circuit MC1 preferably includes, for example, a series-connected inductor, capacitor, LC series circuit, or LC parallel circuit. With this configuration, the impedance or resonant frequency of the second radiating element 12 is set as needed. Since the first matching circuit MC1 is close to the second radiating element 12, the resonant frequency of the second radiating element 12 can be simply determined. The first matching circuit MC1, different from the phase adjustment circuit 14, does not include a shunt-connected inductor or capacitor.

The second matching circuit MC2 preferably includes, for example, a series-connected inductor, capacitor, LC series circuit, or LC parallel circuit. With this configuration, the resonant frequency of the second radiating element 12 is set as needed.

The third matching circuit MC3 preferably includes, for example, a series-connected inductor or capacitor. With this configuration, the resonant frequency of the first radiating element 11 is set as needed.

The fourth matching circuit MC4 preferably includes, for example, a series-connected inductor, capacitor, LC series circuit, or LC parallel circuit. The fourth matching circuit MC4 preferably includes, for example, a shunt-connected inductor, capacitor, LC series circuit, or LC parallel circuit. With these configurations, the characteristic impedance of the first radiating element 11 is matched with the impedance of the first feed circuit FC1. Particularly, when spacing between the first radiating element 11 and the ground conductor GND is narrow, the characteristic impedance of the first radiating element 11 is low. Therefore, when the fourth matching circuit MC4 includes a shunt-connected inductor, the characteristic impedance of the first radiating element 11 can be increased and set to, for example, about 50Ω.

The fifth matching circuit MC5 preferably includes, for example, a series-connected inductor or capacitor. With this configuration, the resonant frequency of the third radiating element 21 is set as needed.

Third Preferred Embodiment

Figure 13:
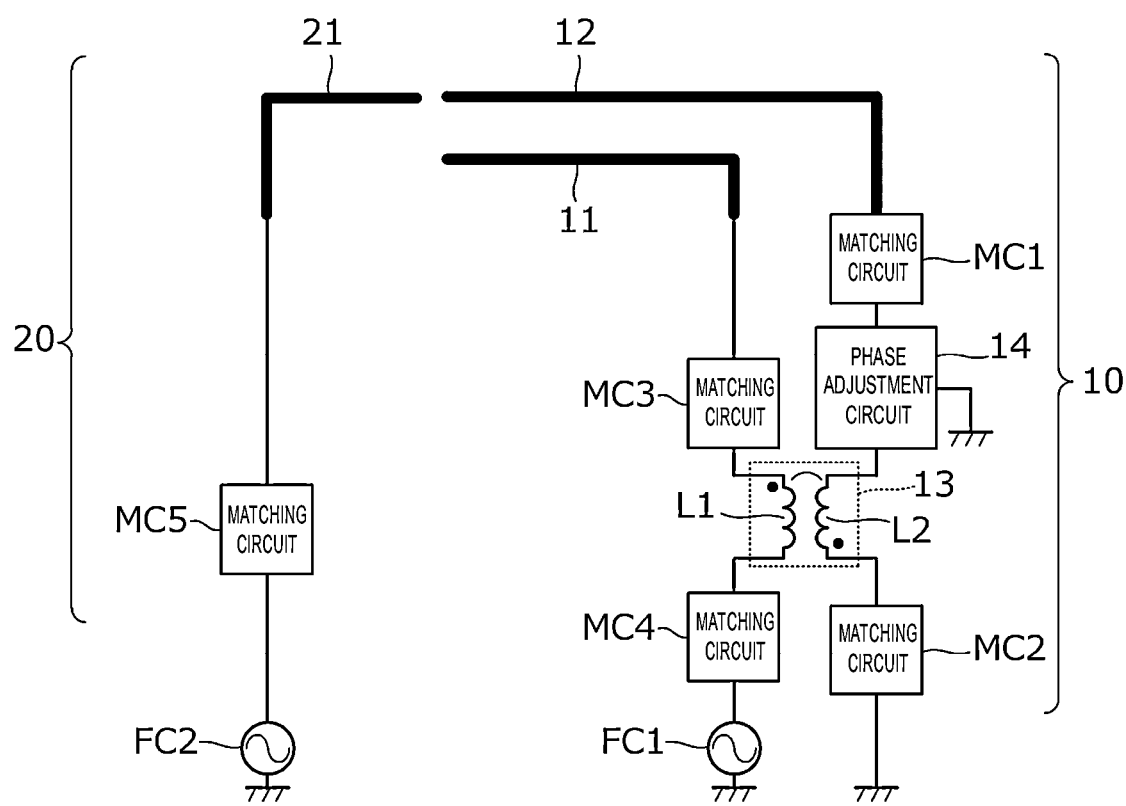
FIG. 13 is a circuit diagram of an antenna apparatus 103 according to a third preferred embodiment of the present invention.

FIG. 13 is a circuit diagram of an antenna apparatus 103 according to a third preferred embodiment of the present invention. The antenna apparatus 103 includes the first antenna 10 and the second antenna 20. The first antenna 10 includes the first radiating element 11, the second radiating element 12, the phase adjustment circuit 14, the coupling element 13, the first matching circuit MC1, the second matching circuit MC2, the third matching circuit MC3, and the fourth matching circuit MC4.

The second antenna 20 includes the third radiating element 21 and the matching circuit MC5.

The operation of the phase adjustment circuit 14 and the matching circuits MC1 to MC5 is as already described in the first and second preferred embodiments.

Each of the first radiating element 11, the second radiating element 12, and the third radiating element 21 is a radiating element such that that the middle of a grounded ¼-wave length monopole radiating element is bent at an angle of about 90°, for example. Different from the example shown in FIG. 2B, the open end of the third radiating element 21 faces the open ends of the first radiating element 11 and second radiating element 12 so as to be close to the open ends.

According to the present preferred embodiment, as in the first preferred embodiment, the first radiating element 11 and the second radiating element 12 extend parallel or substantially parallel to each other over a long dimension, such that a region for the radiating elements 11, 12 is reduced. In addition, a region for another electronic component, such as a camera and a speaker, for example, is ensured under the first radiating element 11 and under the third radiating element 21. The open ends of the first radiating element 11 and third radiating element 21 face each other. However, there is no parallel or substantially parallel extending portion, so electric field coupling between the first radiating element 11 and the third radiating element 21 is weak.

Fourth Preferred Embodiment

Figure 14:
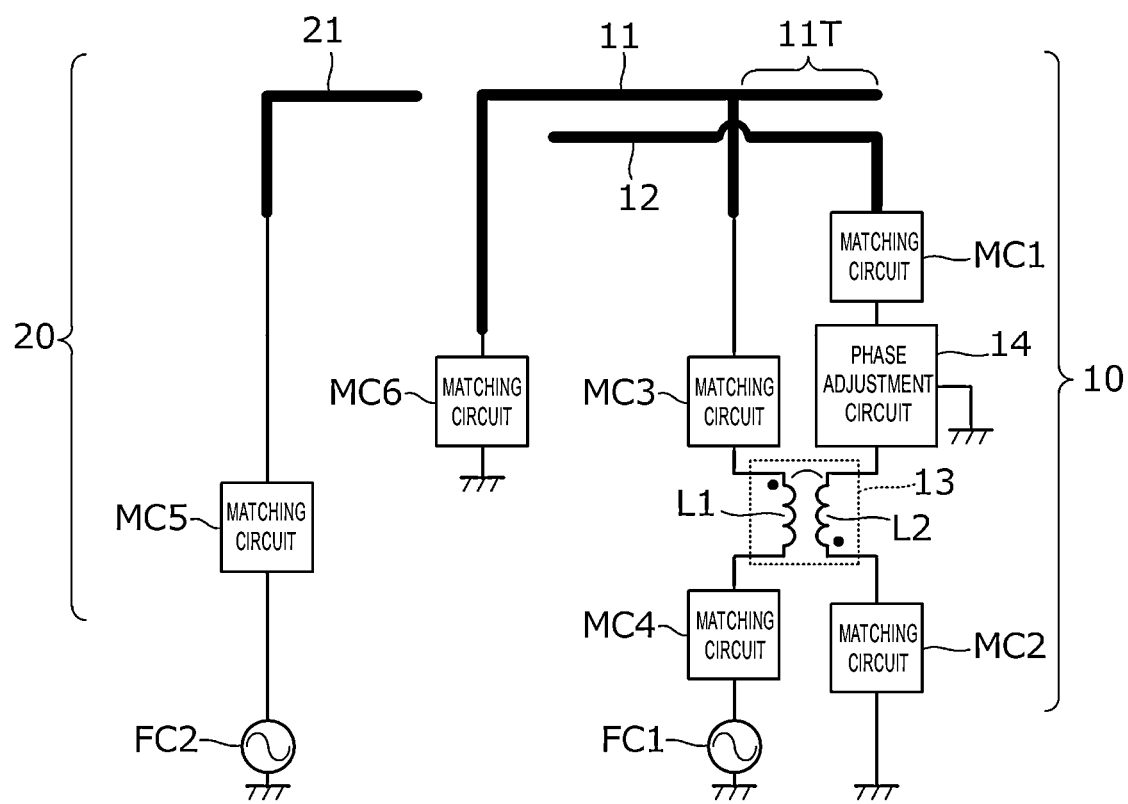
FIG. 14 is a circuit diagram of an antenna apparatus 104 according to a fourth preferred embodiment of the present invention.

FIG. 14 is a circuit diagram of an antenna apparatus 104 according to a fourth preferred embodiment of the present invention. The antenna apparatus 104 includes the first antenna 10 and the second antenna 20. The first antenna 10 includes the first radiating element 11, the second radiating element 12, the phase adjustment circuit 14, the coupling element 13, the first matching circuit MC1, the second matching circuit MC2, the third matching circuit MC3, the fourth matching circuit MC4, and a sixth matching circuit MC6.

The second antenna 20 includes the third radiating element 21 and the matching circuit MC5.

An end portion of the first radiating element 11 away from a feed point is connected to the ground conductor via the sixth matching circuit MC6. The sixth matching circuit MC6 preferably includes, for example, an inductor or a capacitor. With this configuration, the first radiating element 11 defines and functions as a loop antenna with a terminal reactance. A distal end portion 11T of the first radiating element 11 does not define and function as a loop antenna and has a shape smaller than a loop antenna, such that the distal end portion 11T defines functions as a monopole antenna having a higher resonant frequency than a loop antenna. For this reason, further resonant points can be provided in the middle band and high band of the first radiating element 11, such that the frequency band of the first radiating element expands.

The orientation of the open end of the first radiating element 11 and the orientation of the open end of the second radiating element 12 are opposite from each other. With this configuration, coupling between the open ends that are the maximum electric field points in the antenna is further reduced or prevented.

According to the present preferred embodiment, a region for the first radiating element 11 is reduced. Since the first radiating element 11 is a loop radiating element, when the antenna apparatus 104 is used in an electronic device, such as a cellular phone, for example, fluctuations in return loss characteristics and the like when located near a human body are reduced or prevented.

Fifth Preferred Embodiment

Figure 15:
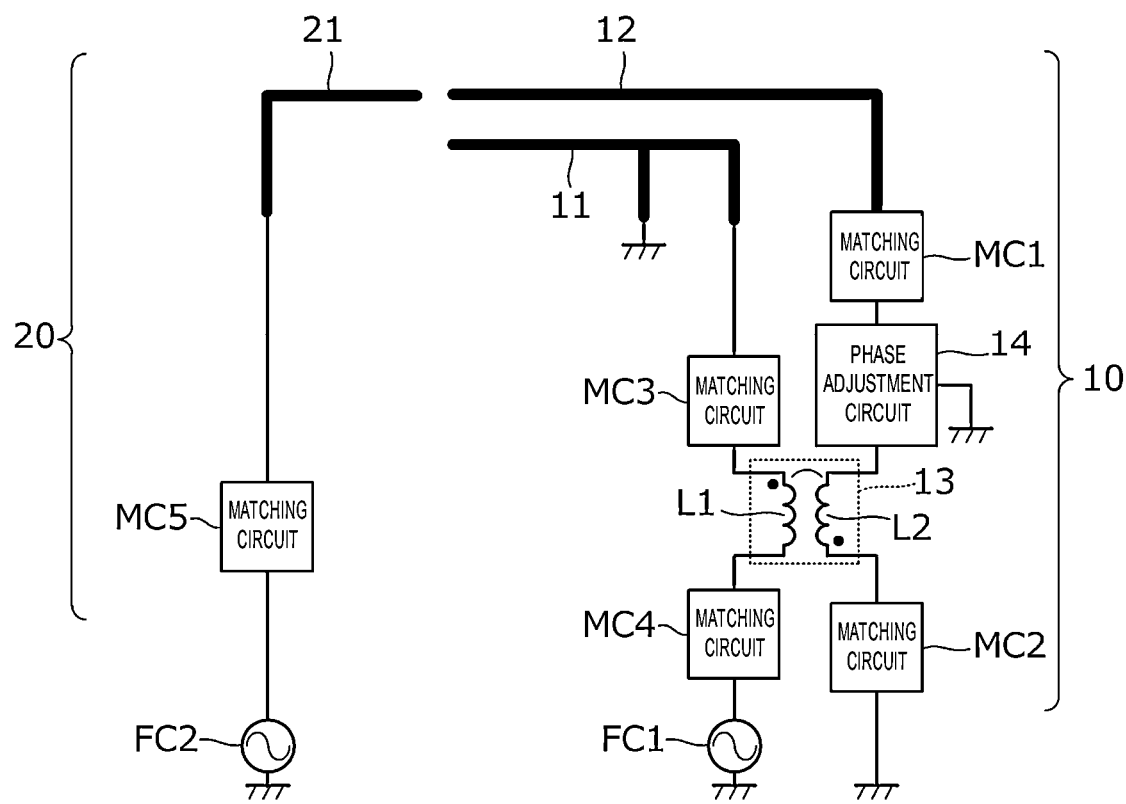
FIG. 15 is a circuit diagram of an antenna apparatus 105 according to a fifth preferred embodiment of the present invention.

FIG. 15 is a circuit diagram of an antenna apparatus 105 according to a fifth preferred embodiment of the present invention. The antenna apparatus 105 includes the first antenna 10 and the second antenna 20. The first antenna 10 includes the first radiating element 11, the second radiating element 12, the phase adjustment circuit 14, the coupling element 13, the first matching circuit MC1, the second matching circuit MC2, the third matching circuit MC3, and the fourth matching circuit MC4. The second antenna 20 includes the third radiating element 21 and the matching circuit MC5.

The first radiating element 11 is an inverted-F antenna radiating element. The first coil L1 of the coupling element 13 is connected to a feed portion of the inverted-F antenna radiating element. The remaining configuration is as described in the third preferred embodiment.

According to the present preferred embodiment, the impedance of the first radiating element 11 is easily matched with the impedance of the first feed circuit FC1, so impedance matching is maintained over a wide band.

Sixth Preferred Embodiment

Figure 16:
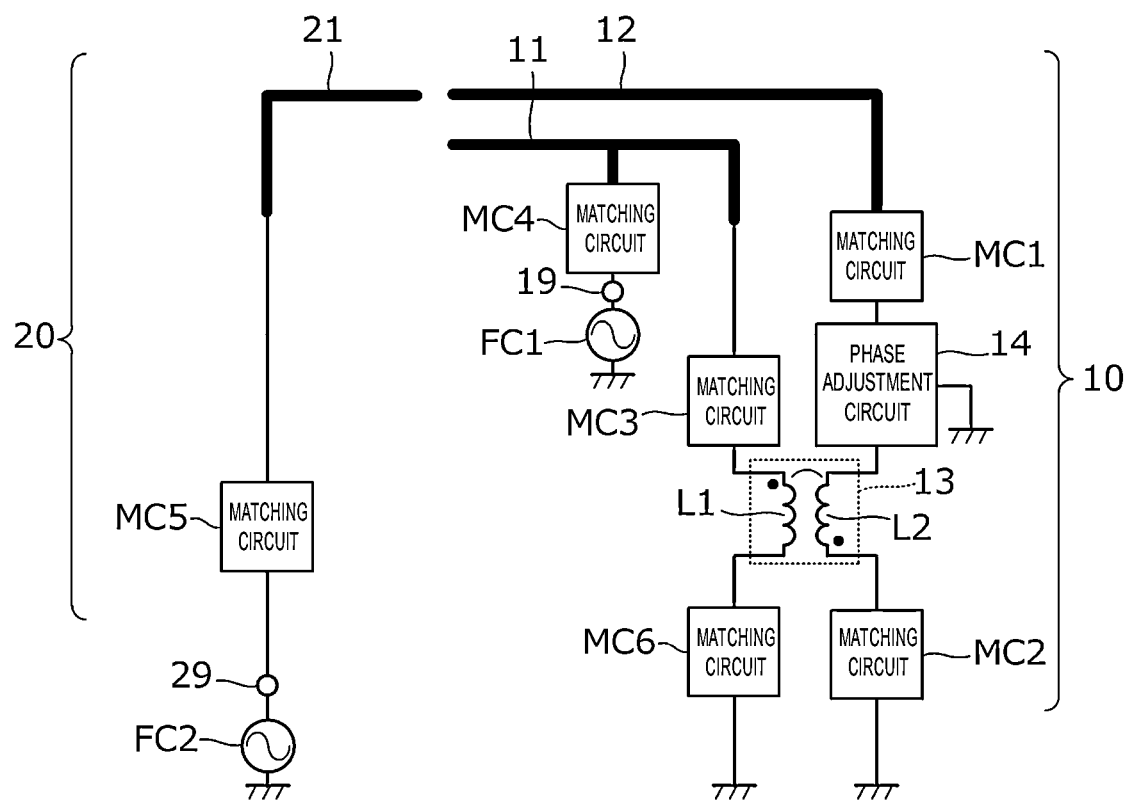
FIG. 16 is a circuit diagram of an antenna apparatus 106A according to a sixth preferred embodiment of the present invention.

FIG. 16 is a circuit diagram of an antenna apparatus 106A according to a sixth preferred embodiment of the present invention. The antenna apparatus 106A includes the first antenna 10 and the second antenna 20. The first antenna 10 includes the first radiating element 11, the second radiating element 12, the phase adjustment circuit 14, the coupling element 13, the first matching circuit MC1, the second matching circuit MC2, the third matching circuit MC3, and the fourth matching circuit MC4. The second antenna 20 includes the third radiating element 21 and the matching circuit MC5.

The first radiating element 11 is an inverted-F antenna radiating element. The first feed circuit FC1 is connected to a short-circuit portion of the inverted-F antenna radiating element via the matching circuit MC4. The first coil L1 of the coupling element 13 is connected between the ground conductor and the short-circuit portion of the inverted-F antenna radiating element. In this example, the matching circuit MC3 is connected between the first radiating element 11 and the first coil L1, and the matching circuit MC6 is inserted between the first coil L1 and the ground conductor.

According to the present preferred embodiment, when the first radiating element 11 resonates, a current flowing through the short-circuit portion increases, and coupling between the first coil L1 and the second coil L2 increases, such that the amount of current flowing through the second radiating element 12 also increases. Therefore, a wide-band effect obtained by adding the second radiating element 12 increases.

Figure 17:
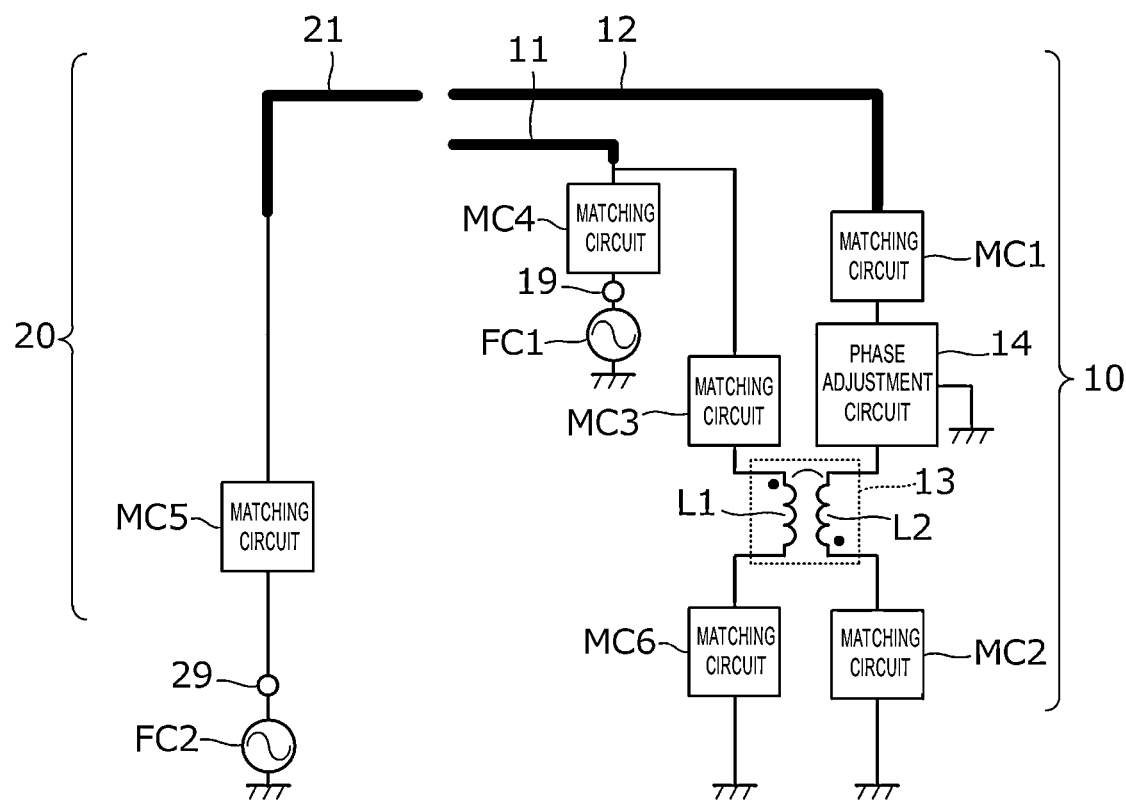
FIG. 17 is a circuit diagram of another antenna apparatus 106B according to the sixth preferred embodiment of the present invention.

FIG. 17 is a circuit diagram of another antenna apparatus 106B according to the sixth preferred embodiment. The antenna apparatus 106B differs from the antenna apparatus 106A shown in FIG. 16 in the configuration of the first radiating element 11 and the connection configuration of the matching circuit MC3 to the first radiating element 11. In the antenna apparatus 106A shown in FIG. 16, an example in which the inverted-F antenna first radiating element 11 is provided and a portion of the first radiating element 11 is passed through from the fourth matching circuit MC4 to the third matching circuit MC3 is described. In the antenna apparatus 106B shown in FIG. 17, the fourth matching circuit MC4 and the third matching circuit MC3 are connected on a substrate. The other configuration is the same or substantially the same as that of the antenna apparatus 106A shown in FIG. 16.

A portion of the inverted-F antenna may include a conductor pattern on a substrate.

Seventh Preferred Embodiment

Figure 18:
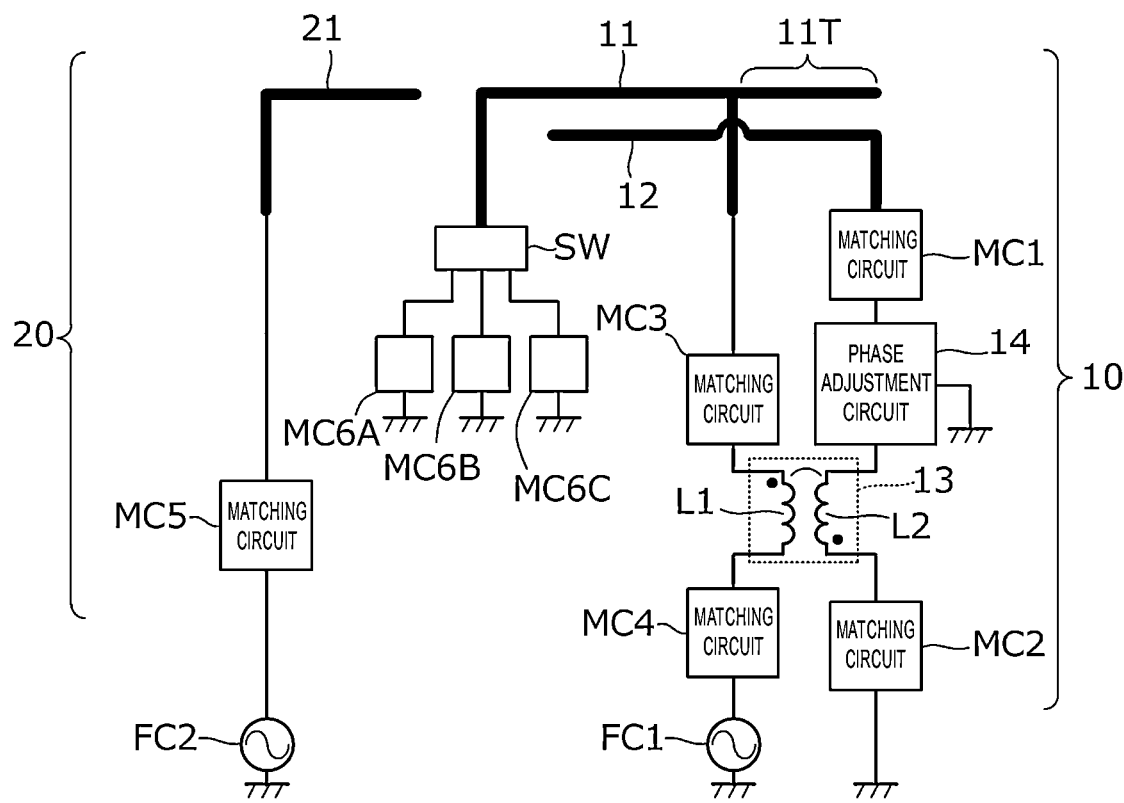
FIG. 18 is a circuit diagram of an antenna apparatus 107 according to a seventh preferred embodiment of the present invention.

FIG. 18 is a circuit diagram of an antenna apparatus 107 according to a seventh preferred embodiment of the present invention. The antenna apparatus 107 includes the first antenna 10 and the second antenna 20. The first antenna 10 includes the first radiating element 11, the second radiating element 12, the phase adjustment circuit 14, the coupling element 13, the first matching circuit MC1, the second matching circuit MC2, the third matching circuit MC3, the fourth matching circuit MC4, sixth matching circuits MC6A, MC6B, MC6C, and a switch SW.

The antenna apparatus 107 differs from the antenna apparatus 104 shown in FIG. 14 in the configurations of the matching circuits MC6A, MC6B, MC6C, and the switch SW. The switch SW is a circuit that switches among the plurality of matching circuits MC6A, MC6B, MC6C, via one of which an end portion located away from the feed point of the first radiating element 11 is connected to the ground conductor. The matching circuits MC6A, MC6B, MC6C are each an inductor or a capacitor that have different reactance values.

According to the present preferred embodiment, the frequency of the fundamental and third harmonic frequency of the first radiating element 11 can be set as needed by selecting from among the matching circuits MC6A, MC6B, MC6C, such that the size of the first radiating element 11 to obtain desired antenna characteristics is reduced, and a region for the first radiating element 11 is reduced.

Eighth Preferred Embodiment

Figure 19:
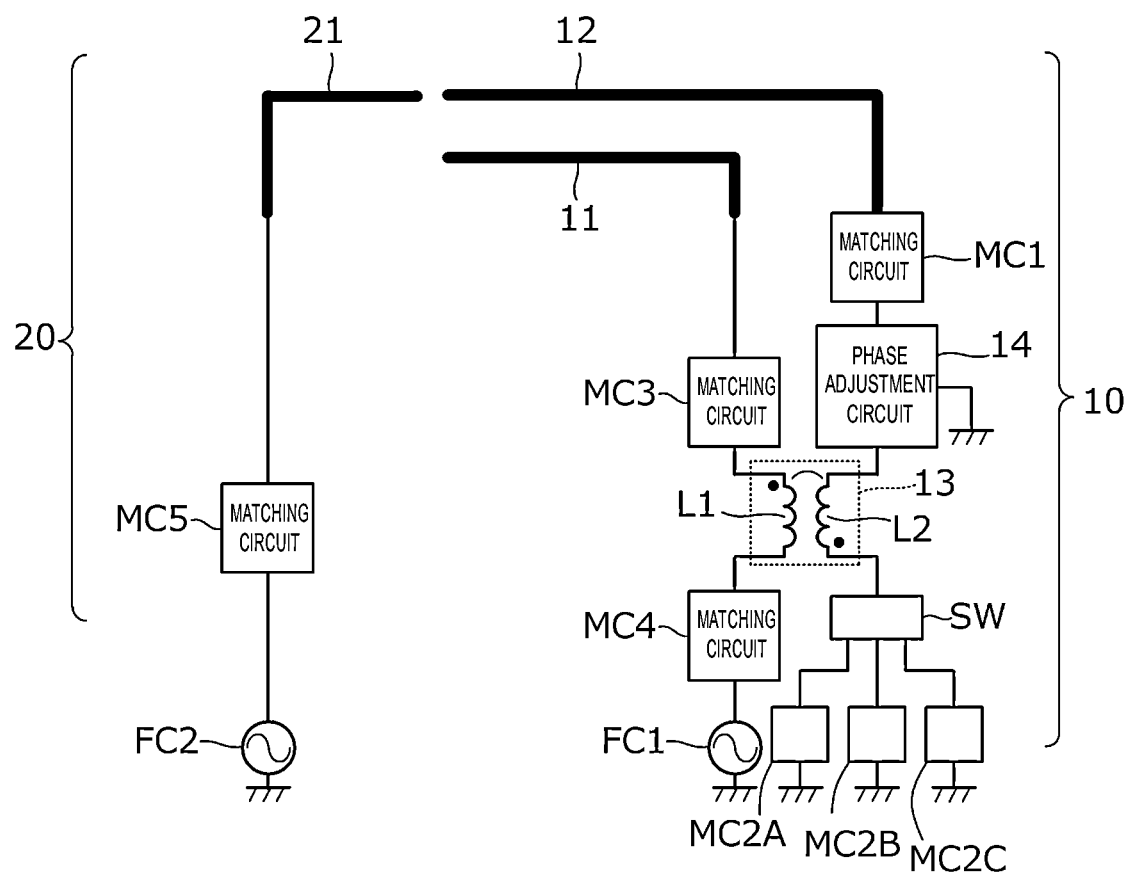
FIG. 19 is a circuit diagram of an antenna apparatus 108 according to an eighth preferred embodiment of the present invention.

FIG. 19 is a circuit diagram of an antenna apparatus 108 according to an eighth preferred embodiment of the present invention. The antenna apparatus 108 includes the first antenna 10 and the second antenna 20. The first antenna 10 includes the first radiating element 11, the second radiating element 12, the phase adjustment circuit 14, the coupling element 13, the first matching circuit MC1, second matching circuits MC2A, MC2B, MC2C, the third matching circuit MC3, and the fourth matching circuit MC4.

The antenna apparatus 108 differs from the antenna apparatus 103 shown in FIG. 13 in the configurations of the matching circuits MC2A, MC2B, MC2C, and the switch SW. The switch SW is a circuit that switches among the plurality of matching circuits MC2A, MC2B, MC2C, one of which is inserted between the ground conductor and the second coil L2 of the coupling element 13. The matching circuits MC2A, MC2B, MC2C are each an inductor or a capacitor that have different reactance values.

According to the present preferred embodiment, the resonant frequency of the second radiating element 12 can be set as needed by selecting from among the matching circuits MC2A, MC2B, MC2C, such that the size of the second radiating element 12 to obtain desired antenna characteristics is reduced, and a region for the second radiating element 12 is reduced.

Ninth Preferred Embodiment

Figure 20:
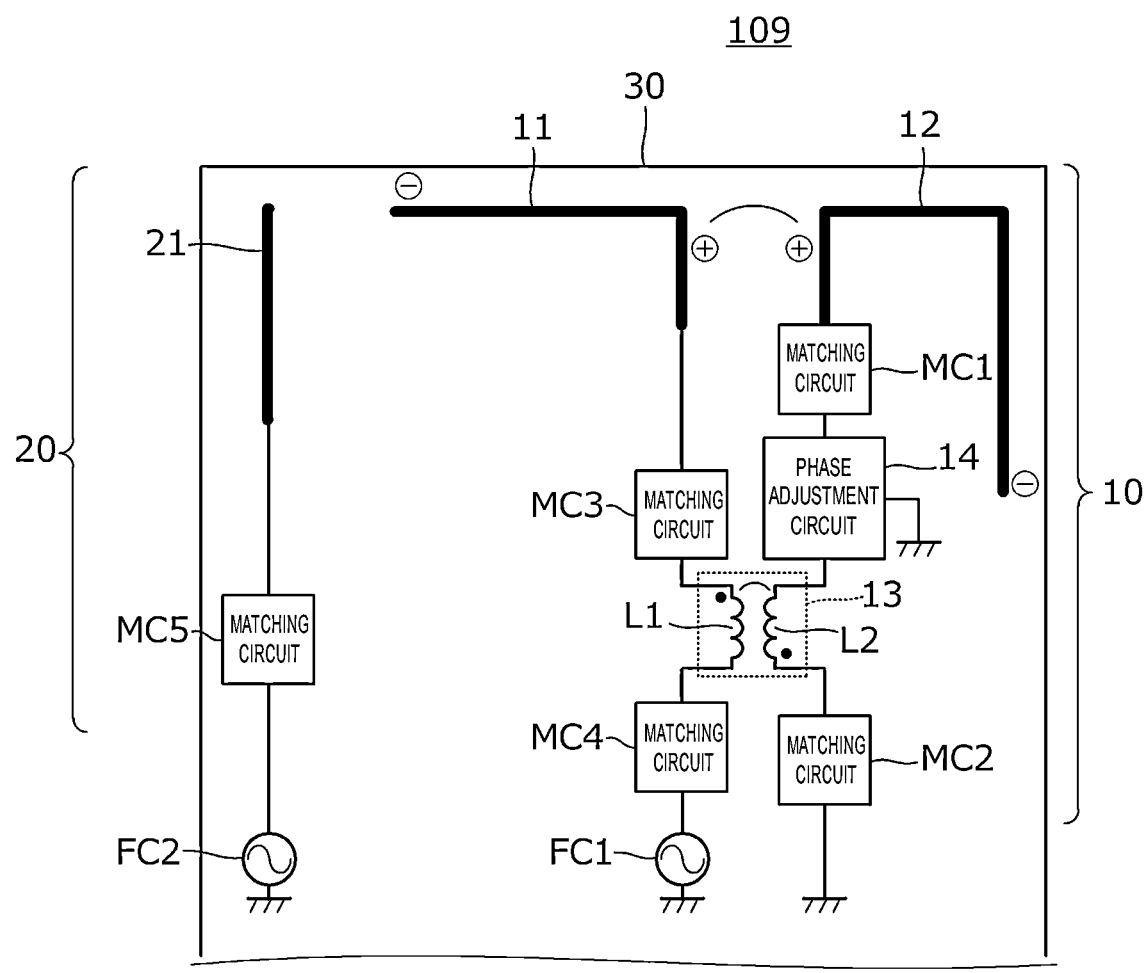
FIG. 20 is a circuit diagram of an antenna apparatus 109 according to a ninth preferred embodiment of the present invention.

FIG. 20 is a circuit diagram of an antenna apparatus 109 according to a ninth preferred embodiment of the present invention. The antenna apparatus 109 includes the first antenna 10 and the second antenna 20. The first antenna 10 includes the first radiating element 11, the second radiating element 12, the phase adjustment circuit 14, the coupling element 13, the first matching circuit MC1, the second matching circuit MC2, the third matching circuit MC3, and the fourth matching circuit MC4. The second antenna 20 includes the third radiating element 21 and the matching circuit MC5.

The operation of the phase adjustment circuit 14 and matching circuits MC1 to MC5 is as already described in the first and second preferred embodiments.

The first radiating element 11 is a radiating element such that the middle of a grounded ¼-wave length monopole radiating element is bent at an angle of about 90°, for example. The second radiating element 12 is a radiating element such that the middle of a grounded ¼-wave length monopole radiating element is bent at an angle of about 90° at two points, for example. The third radiating element 21 is a linear monopole radiating element.

In FIG. 20, the plus and minus signs indicate an example of polarities of potentials in the middle band and high band (that is, in a state where the resonance of the third harmonic is used) of the first antenna 10. The coupling element 13 is coupled in additive polarity in this way, such that close portions (proximal portions or portions around the proximal portions) of the first radiating element 11 and the second radiating element 12 are in the same polarity (in phase) with the resonance of the third harmonic. With this configuration, unnecessary electric field coupling between the first radiating element 11 and the second radiating element 12 is reduced, and isolation between the first radiating element 11 and the second radiating element 12 is ensured. In other words, the middle band and the high band are effectively widened by adding the second radiating element 12.

The phase adjustment circuit 14 sets a phase difference between a current flowing through the first radiating element 11 and a current flowing through the second radiating element 12 in opposite phase (e.g., greater than or equal to about 90 degrees and less than about 180 degrees) in the communication frequency band of the second antenna 20. For this reason, in the communication frequency band of the second antenna 20, isolation between the first antenna 10 and the second antenna 20 is ensured.

Since the resonant frequency of the fundamental of the second radiating element 12 is lower than the resonant frequency of the fundamental of the first radiating element 11 (f1>f2), the line length of the second radiating element 12 is longer than the line length of the first radiating element 11. In the present preferred embodiment, the open end of the longer second radiating element 12 is located away from the open end of the third radiating element 21 of the second antenna 20. Therefore, unnecessary electric field coupling between the open ends of the second radiating element 12 and third radiating element 21 is reduced. Since the second radiating element 12 is not close to or surrounds the third radiating element 21, a gain of the second antenna 20 is increased.

In the example shown in FIG. 20, the first radiating element 11, the second radiating element 12, and the third radiating element 21 are disposed along the edge of a casing 30, such that each radiating element has high radiation characteristics. Since the first radiating element 11 fed by the first feed circuit FC1 is a "feed radiating element", the first radiating element 11 has low flexibility to being changed, whereas, since the second radiating element 12 is a "passive radiating element", the second radiating element 12 has high flexibility in changing the pattern. Therefore, the configuration as described in the present preferred embodiment is also possible.

Tenth Preferred Embodiment

Figure 21A:
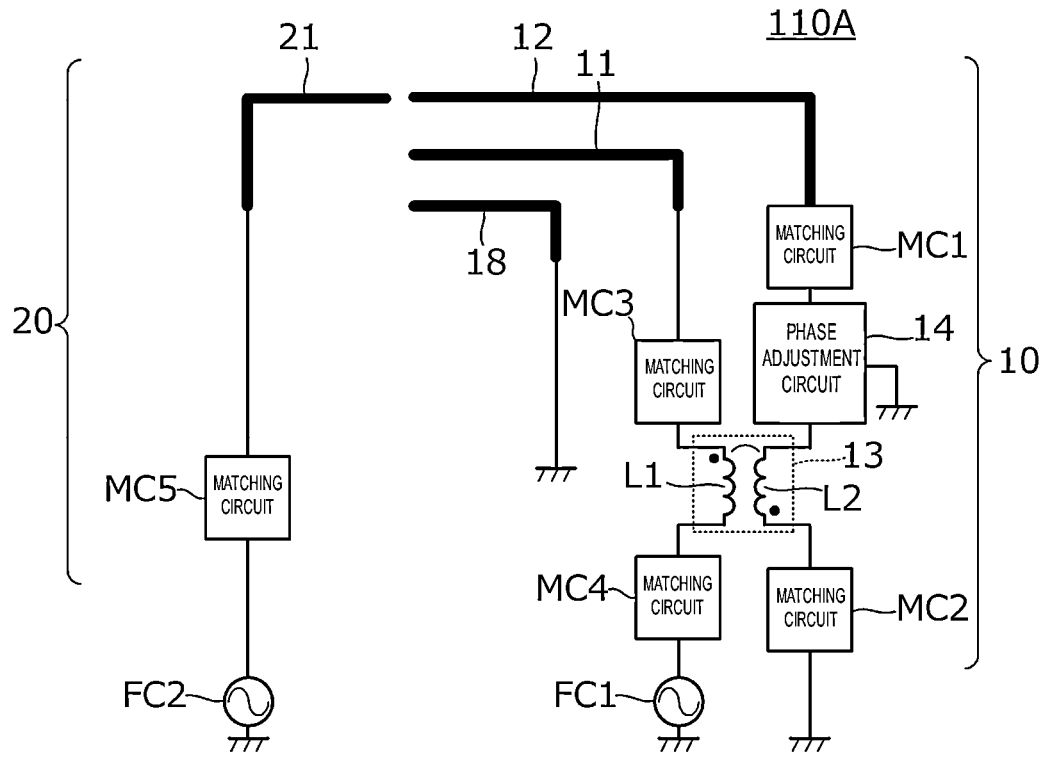
FIG. 21A is a circuit diagram of an antenna apparatus 110A according to a tenth preferred embodiment.
Figure 21B:
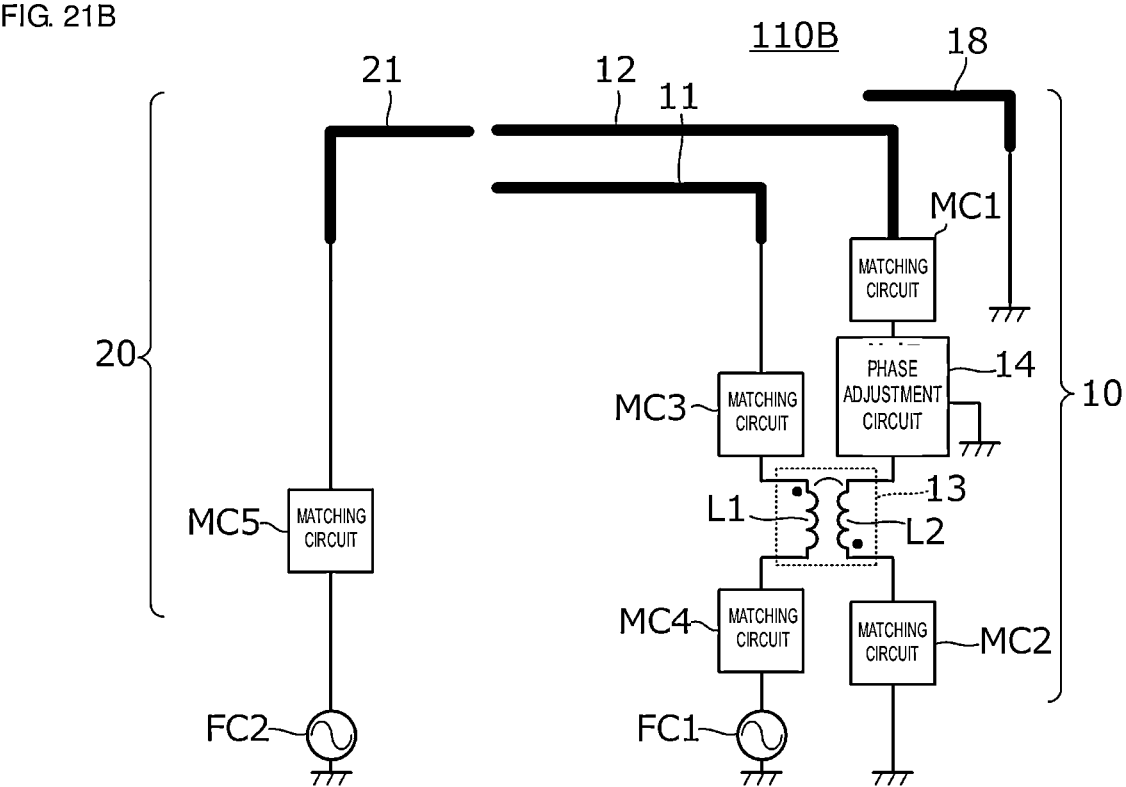
FIG. 21B is a circuit diagram of another antenna apparatus 110B according to the tenth preferred embodiment of the present invention.
Figure 22A:
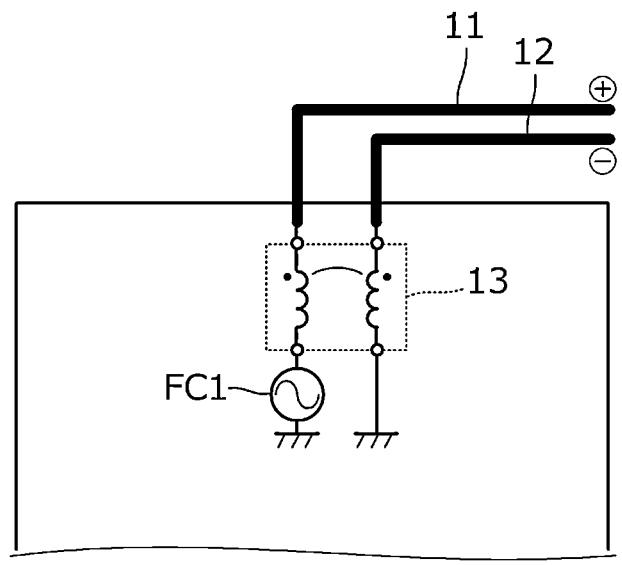
FIG. 22A is a configuration diagram of an antenna apparatus in which the first radiating element 11 and the second radiating element 12 are disposed such that the maximum electric field points of the first radiating element 11 and second radiating element 12 are close to each other.
Figure 22B:
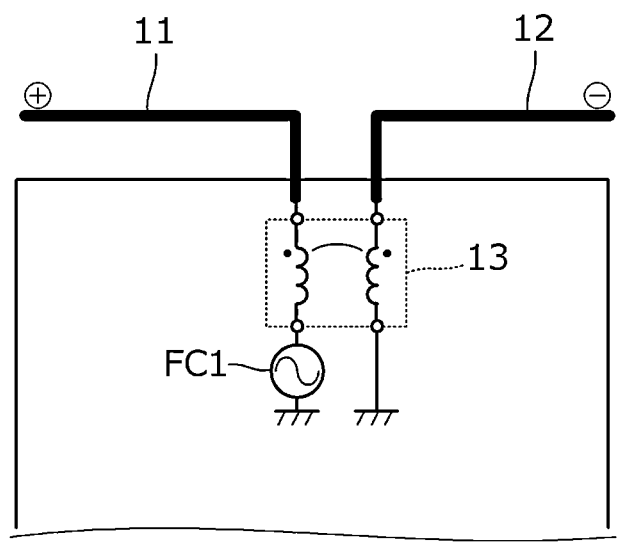
FIG. 22B is a configuration diagram of an antenna apparatus in which the first radiating element 11 and the second radiating element 12 are disposed such that open ends are located away from each other.

FIG. 21A is a circuit diagram of an antenna apparatus 110A according to a tenth preferred embodiment of the present invention. FIG. 21B is a circuit diagram of another antenna apparatus 110B according to the tenth preferred embodiment. Each of the antenna apparatuses 110A, 110B includes a fourth radiating element 18. Each fourth radiating element 18 is a grounded ¼-wave length monopole radiating element.

In the antenna apparatus 110A, the fourth radiating element 18 extends parallel or substantially parallel to the first radiating element 11 and is coupled to the first radiating element 11 with an electromagnetic field. In the antenna apparatus 110B, the fourth radiating element 18 extends parallel or substantially parallel to the second radiating element 12 and is coupled to the second radiating element 12 with an electromagnetic field. The remaining configuration is as described in the third preferred embodiment.

According to the present preferred embodiment, the radiation characteristics of the fourth radiating element 18 are added to the first antenna 10, such that the first antenna 10 has a wider band.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna apparatus comprising:
   a first antenna; and
   a second antenna usable in a communication frequency band different from a communication frequency band in which the first antenna is used; wherein
   the first antenna includes a first radiating element, a second radiating element, a phase adjustment circuit, a first coil, and a second coil;
   the first radiating element and the second radiating element include parallel extending portions;
   the first coil is connected between the first radiating element and a connection portion of a first feed circuit;
   the second coil is connected between the second radiating element and a ground conductor;
   the phase adjustment circuit is connected to the second coil;
   the first coil and the second coil are provided in a single coupling element; and
   the phase adjustment circuit adjusts a phase difference between a current flowing through the first radiating element and a current flowing through the second radiating element to greater than or equal to about 90 degrees and less than about 180 degrees in a communication frequency band of the second antenna.

2. The antenna apparatus according to claim 1, wherein, where a frequency of a fundamental of the first radiating element is f1 and a frequency of a fundamental of the second radiating element is f2, the first antenna satisfies f1>f2, and 3f2−f1>f1−f2.

3. The antenna apparatus according to claim 1, wherein a distance between a maximum electric field point at a resonant frequency of a fundamental of the first radiating element and a maximum electric field point at a resonant frequency of a fundamental of the second radiating element is less than a distance between the maximum electric field point at the resonant frequency of the fundamental of the first radiating element and a maximum electric field point of the ground conductor at the resonant frequency of the fundamental of the first radiating element.

4. The antenna apparatus according to claim 1, wherein
   a size of the ground conductor is greater than either of a size of the first radiating element and a size the second radiating element;
   the first radiating element and the second radiating element each include an open end; and
   a distance between the open end of the first radiating element and the ground conductor is greater than a distance between the open end of the first radiating element and the open end of the second radiating element.

5. The antenna apparatus according to claim 1, wherein the first coil, the second coil, and the phase adjustment circuit are provided in a single coupling element.

6. The antenna apparatus according to claim 1, further comprising a first matching circuit connected between the phase adjustment circuit and the second radiating element.

7. The antenna apparatus according to claim 1, further comprising a second matching circuit connected between the second coil and the ground conductor.

8. The antenna apparatus according to claim 7, wherein the second matching circuit includes a plurality of matching circuits and a switch that selects any one of the plurality of matching circuits.

9. The antenna apparatus according to claim 1, further comprising a third matching circuit connected between the first coil and the first radiating element.

10. The antenna apparatus according to claim 1, further comprising a fourth matching circuit connected between the first coil and the connection portion of the first feed circuit.

11. The antenna apparatus according to claim 1, further comprising a fifth matching circuit connected between a third radiating element and a connection portion of a second feed circuit.

12. The antenna apparatus according to claim 1, further comprising a sixth matching circuit connected between the first radiating element and the ground conductor.

13. The antenna apparatus according to claim 12, wherein the sixth matching circuit includes a plurality of matching circuits and a switch to select any one of the plurality of matching circuits.

14. The antenna apparatus according to claim 1, wherein the phase adjustment circuit includes a capacitor with one end connected to the ground conductor or an inductor with one end connected to the ground conductor.

15. The antenna apparatus according to claim 1, wherein each of the first radiating element and the second radiating element is a monopole radiating element.

16. The antenna apparatus according to claim 1, wherein the first radiating element is an inverted-F antenna radiating element, and the first coil is connected to a feed portion of the inverted-F antenna radiating element.

17. The antenna apparatus according to claim 1, wherein the first radiating element is an inverted-F antenna radiating element, and the first coil is connected to a short-circuit portion of the inverted-F antenna radiating element.

18. The antenna apparatus according to claim 15, wherein an open end of the first radiating element and an open end of the second radiating element are respectively located in a direction away from each other from a proximal portion of the first radiating element adjacent to or in a vicinity of the first coil of the first radiating element, and a proximal portion of the second radiating element adjacent to or in a vicinity of to the second coil of the second radiating element.

19. The antenna apparatus according to claim 1, wherein the first radiating element is a loop radiating element that terminates at a terminal portion via a reactance.

20. The antenna apparatus according to claim 1, further comprising a fourth radiating element coupled to the first radiating element or the second radiating element with an electromagnetic field.

\* \* \* \* \*